US012531331B2

(12) United States Patent
Zhu et al.

(10) Patent No.: US 12,531,331 B2
(45) Date of Patent: Jan. 20, 2026

(54) ANTENNA STRUCTURE AND ELECTRONIC DEVICE

(71) Applicant: Huawei Technologies Co., Ltd., Shenzhen (CN)

(72) Inventors: Naida Zhu, Shenzhen (CN); Hanyang Wang, Reading (GB); Yu Yao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 18/717,866

(22) PCT Filed: Dec. 5, 2022

(86) PCT No.: PCT/CN2022/136513
§ 371 (c)(1),
(2) Date: Jun. 7, 2024

(87) PCT Pub. No.: WO2023/103945
PCT Pub. Date: Jun. 15, 2023

(65) Prior Publication Data

US 2025/0046988 A1 Feb. 6, 2025

(30) Foreign Application Priority Data

Dec. 9, 2021 (CN) ......................... 202111495734.8

(51) Int. Cl.
*H01Q 1/22* (2006.01)
*H01Q 1/38* (2006.01)

(52) U.S. Cl.
CPC ................ *H01Q 1/38* (2013.01); *H01Q 1/22* (2013.01)

(58) Field of Classification Search
CPC .................................. H01Q 1/38; H01Q 1/22
See application file for complete search history.

(56) References Cited

U.S. PATENT DOCUMENTS 10,283,832 B1 5/2019 Chayat et al.
2016/0276727 A1* 9/2016 Dang ...................... H01Q 1/48

FOREIGN PATENT DOCUMENTS

| | | | |
|---|---|---|---|
| CN | 111244623 | A | 6/2020 |
| CN | 113555692 | A | 10/2021 |
| CN | 114976583 | A | 8/2022 |
| EP | 2565985 | A1 | 3/2013 |

(Continued)

OTHER PUBLICATIONS

Yang Qingling et al., "Cavity-Backed Slot-Coupled Patch Antenna Array With Dual Slant Polarization for Millimeter-Wave Base Station Applications", IEEE Transactions on Antennas and Propagation, IEEE, USA, vol. 69, No. 3, Aug. 24, 2020 (Aug. 24, 2020), pp. 1404-1413, XP011842548, ISSN: 0018-926X, DOI: 10.1109/TAP.2020.3017388.

(Continued)

*Primary Examiner* — Henry Luong
(74) *Attorney, Agent, or Firm* — Slater Matsil, LLP

(57) ABSTRACT

An antenna structure includes a metal cavity and a first radiator. A first slot and a second slot are provided on a first metal layer of the metal cavity, and a first end of the second slot is connected to the first slot. A first feed point is disposed in the first slot, and a second feed point is disposed in the second slot.

20 Claims, 17 Drawing Sheets

(56) References Cited

FOREIGN PATENT DOCUMENTS

| | | | |
|---|---|---|---|
| WO | 2021022941 | A1 | 2/2021 |
| WO | 2021180590 | A1 | 9/2021 |

OTHER PUBLICATIONS

K. Ch. DIMITROV et al., "Circularly Polarized T-Shaped Slot Waveguide Array Antenna for Satellite Communications," Dec. 23, 2019, total 5 pages.

Kam Eucharist Kedze et al., "Design of a Reduced-Size Crossed-Dipole Antenna," Aug. 19, 2020, total 9 pages.

* cited by examiner

Side view

Three-dimensional diagram

Side view (a)

(b)

(a)

(b)

ANTENNA STRUCTURE AND ELECTRONIC DEVICE

CROSS-REFERENCE TO RELATED APPLICATIONS

This application is a National Stage of International Patent Application No. PCT/CN2022/136513, filed on Dec. 5, 2022, which claims priority to Chinese Patent Application No. 202111495734.8, filed on Dec. 9, 2021, both of which are hereby incorporated by reference in their entireties.

TECHNICAL FIELD

This application relates to the field of wireless communication, and in particular, to an antenna structure and an electronic device.

BACKGROUND

With rapid development of wireless communication technologies, low frequencies of a radio spectrum tend to be saturated. A millimeter-wave band has abundant spectrum resources. Therefore, millimeter waves can provide a solution for high-speed wireless communication. A millimeter-wave antenna requires a broadband and high-gain performance to implement high-speed data transmission, a low latency, and high reliability. To better receive and transmit signals, a millimeter-wave antenna in an electronic device needs to have dual-polarization performance, to receive communication information from different directions. In addition, because space of the electronic device is limited, an antenna structure that is not compact enough causes an increase in a size of the electronic device. This imposes a strict requirement on a miniaturization design of the antenna.

SUMMARY

Embodiments of this application provide an antenna structure and an electronic device. Horizontally polarized radiation and vertically polarized radiation may be respectively generated by using slots provided on a metal cavity of the antenna structure. In addition, a radiator disposed above the slot may expand an operating bandwidth of the antenna structure, so that an operating frequency band of the antenna structure includes more communication frequency bands. In addition, a width of the antenna structure provided in embodiments of this application may be less than a width of a side frame of the electronic device, thereby facilitating application in the electronic device.

According to a first aspect, an antenna structure is provided, including: a metal cavity, where the metal cavity includes a first metal layer and a second metal layer that are disposed opposite to each other, and a metal wall that connects the first metal layer and the second metal layer; and a first radiator, where the first radiator and the metal cavity are disposed opposite to each other and are spaced apart, and the first radiator is located on a side that is of the first metal layer and that is away from the second metal layer. A first slot and a second slot are provided on the first metal layer, and a first end of the second slot is connected to the first slot. Projections of the first slot, the second slot, and the first radiator in a first direction at least partially overlap, and the first direction is a direction perpendicular to the first metal layer. A first feed point is disposed in the first slot, and a second feed point is disposed in the second slot.

According to the technical solution in this embodiment of this application, the second metal layer is used as a ground of the antenna structure, and a T-shaped slot provided on the first metal layer may be used to generate a horizontally polarized electromagnetic wave and a vertically polarized electromagnetic wave. Because the horizontally polarized electromagnetic wave and the vertically polarized electromagnetic wave are orthogonal to each other, coupling between the horizontally polarized electromagnetic wave and the vertically polarized electromagnetic wave can be greatly reduced. Therefore, the antenna structure may be used in a MIMO system. In addition, the first radiator is disposed in the antenna structure, and may be in a coupling connection to the T-shaped slot to generate an additional resonant frequency band for expanding an operating frequency band of the antenna structure, so that the antenna structure is used in more communication frequency bands.

With reference to the first aspect, in some implementations of the first aspect, a third slot is provided on the first radiator, and an extension direction of the third slot is parallel to an extension direction of the first slot.

According to the technical solution in this embodiment of this application, the third slot is provided on the first radiator, and therefore an additional magnetic flow is generated by using the third slot when the first metal layer resonates, so that electromagnetic waves of more operating frequency bands can be radiated outward, and a current on the ground (the second metal layer) is reduced, thereby improving a radiation characteristic of the antenna structure.

With reference to the first aspect, in some implementations of the first aspect, the first radiator is divided by using the third slot into a first part and a second part that are spaced apart.

With reference to the first aspect, in some implementations of the first aspect, the first part includes a bent radiator and is bent towards the first metal layer; and the second part includes a bent radiator and is bent towards the first metal layer.

According to the technical solution in this embodiment of this application, the first radiator of a planar structure is folded into a three-dimensional structure, to reduce a width of the first radiator, and reduce a width of the antenna structure. This implements miniaturization of the antenna structure, so that the antenna structure is disposed in the electronic device.

With reference to the first aspect, in some implementations of the first aspect, the antenna structure further includes a second radiator. The second radiator and the first radiator are disposed opposite to each other and are spaced apart, and the second radiator is located on a side that is of the first radiator and that is away from the metal cavity.

According to the technical solution in this embodiment of this application, the second radiator is additionally disposed in the antenna structure, and may be used to generate an additional resonant frequency band, so that an operating frequency band of the antenna structure can be expanded to include more communication frequency bands.

With reference to the first aspect, in some implementations of the first aspect, the first feed point is disposed at a joint of the first slot and the second slot.

With reference to the first aspect, in some implementations of the first aspect, the first slot has a same length on two sides of the first feed point.

According to the technical solution in this embodiment of this application, as symmetry of the antenna structure increases, a radiation characteristic of the antenna structure can be improved.

With reference to the first aspect, in some implementations of the first aspect, the antenna structure further includes a first feed stub and a second feed stub. The first feed stub and the second feed stub are disposed in the metal cavity. Projections of the first feed stub and the first slot in the first direction at least partially overlap. Projections of the second feed stub and the second slot in the first direction at least partially overlap.

According to the technical solution in this embodiment of this application, a first feed unit and a second feed unit may feed the antenna structure at the first feed point and the second feed point in a coupled feeding manner, so that an operating frequency band of the antenna structure can be expanded.

With reference to the first aspect, in some implementations of the first aspect, the first feed stub is L-shaped, and the second feed stub is straight line-shaped.

According to the technical solution in this embodiment of this application, specific shapes of the first feed stub and the second feed stub are not limited in this application. For example, the first feed stub and the second feed stub may be in a regular or an irregular shape like a rectangle, a circle, a fold line, or a fish fork. The specific shapes of the first feed stub and the second feed stub may be adjusted based on a shape or a design requirement of the metal cavity.

With reference to the first aspect, in some implementations of the first aspect, the antenna structure further includes at least one metal post. The at least one metal post is disposed on any side around the first radiator, and the metal post is electrically connected to the first metal layer.

According to the technical solution in this embodiment of this application, the metal post may be used to expand the ground (the second metal layer) of the antenna structure, and increase a current path on the ground, to reduce impact caused by an excessively small ground area on impedance of the antenna structure. This improves a radiation characteristic (for example, an operating bandwidth) of the antenna structure 100.

With reference to the first aspect, in some implementations of the first aspect, the extension direction of the first slot is perpendicular to an extension direction of the second slot.

With reference to the first aspect, in some implementations of the first aspect, a physical length of the first slot is a half of a first wavelength±10%, a physical length of the second slot is a quarter of the first wavelength±10%, and the first wavelength is an operating wavelength of the antenna structure.

According to the technical solution in this embodiment of this application, when the first feed unit performs feeding, radiation generated by the T-shaped slot is mainly generated by the first slot. An electrical length of the first slot may be a half of the first wavelength, so that the antenna structure operates in a half wavelength mode by using the first slot. When the second feed unit performs feeding, radiation generated by the T-shaped slot is mainly generated by the second slot and is partially generated by the first slot. An electrical length of the second slot may be a quarter of the first wavelength, so that the antenna structure operates in a quarter wavelength mode by using the second slot. Because the electrical length of the second slot is less than a half of the first wavelength, the antenna structure is compact, which is more beneficial to disposing the antenna structure in the electronic device.

With reference to the first aspect, in some implementations of the first aspect, a fourth slot is provided on the first metal layer, and the fourth slot is connected to a second end of the second slot.

According to the technical solution in this embodiment of this application, the fourth slot may be configured to increase a magnetic flow path at the second end of the second slot, so that when the second feed unit performs feeding, a length of the second slot is further shortened to reduce a width of the first metal layer in a case in which the magnetic flow path in the T-shaped slot remains unchanged. This further reduces a width of the antenna structure.

With reference to the first aspect, in some implementations of the first aspect, the width of the antenna structure is less than 3.5 mm.

According to the technical solution in this embodiment of this application, the width of the antenna structure may be less than 0.3 low-frequency wavelengths. For example, the low-frequency wavelength may be a wavelength corresponding to a lowest frequency of an operating frequency band. For example, the antenna structure operates on n257 and n258 frequency bands, and a width L2 of the antenna structure may be less than 3.5 mm.

With reference to the first aspect, in some implementations of the first aspect, a length of the antenna structure is less than 4.5 mm.

According to the technical solution in this embodiment of this application, the length of the antenna structure may be less than 0.4 low-frequency wavelengths. For example, the antenna structure operates on n257 and n258 frequency bands, and a length L1 of the antenna structure may be less than 4.5 mm, so that a length of a side frame occupied by disposing a same quantity of antenna structures may be shorter.

With reference to the first aspect, in some implementations of the first aspect, an operating frequency band of the antenna structure ranges from 24.25 GHz to 29.5 GHz.

With reference to the first aspect, in some implementations of the first aspect, an operating frequency band of the antenna structure ranges from 37 GHz to 43.5 GHz.

According to the technical solution in this embodiment of this application, the antenna structure may operate in a millimeter-wave band.

According to a second aspect, an electronic device is provided, including the antenna structure according to any one of implementations of the first aspect.

With reference to the second aspect, in some implementations of the second aspect, the electronic device further includes a side frame, and a fifth slot is provided on the side frame. At least a part of the antenna structure is disposed between conductors on two sides of the fifth slot.

With reference to the second aspect, in some implementations of the second aspect, the electronic device further includes a first dielectric board, and the first dielectric board is disposed between the first metal layer and the first radiator.

With reference to the second aspect, in some implementations of the second aspect, the electronic device further includes a second dielectric board, and the second dielectric board is disposed between the first radiator and the second radiator.

With reference to the second aspect, in some implementations of the second aspect, the electronic device further includes a third dielectric board and a fourth dielectric board. At least a part of the third dielectric board and at least a part of the fourth dielectric board are stacked in the metal cavity in the first direction, and the first feed stub and the second feed stub are disposed between the third dielectric board and the fourth dielectric board.

DETAILED DESCRIPTION OF ILLUSTRATIVE EMBODIMENTS

Figure 1:
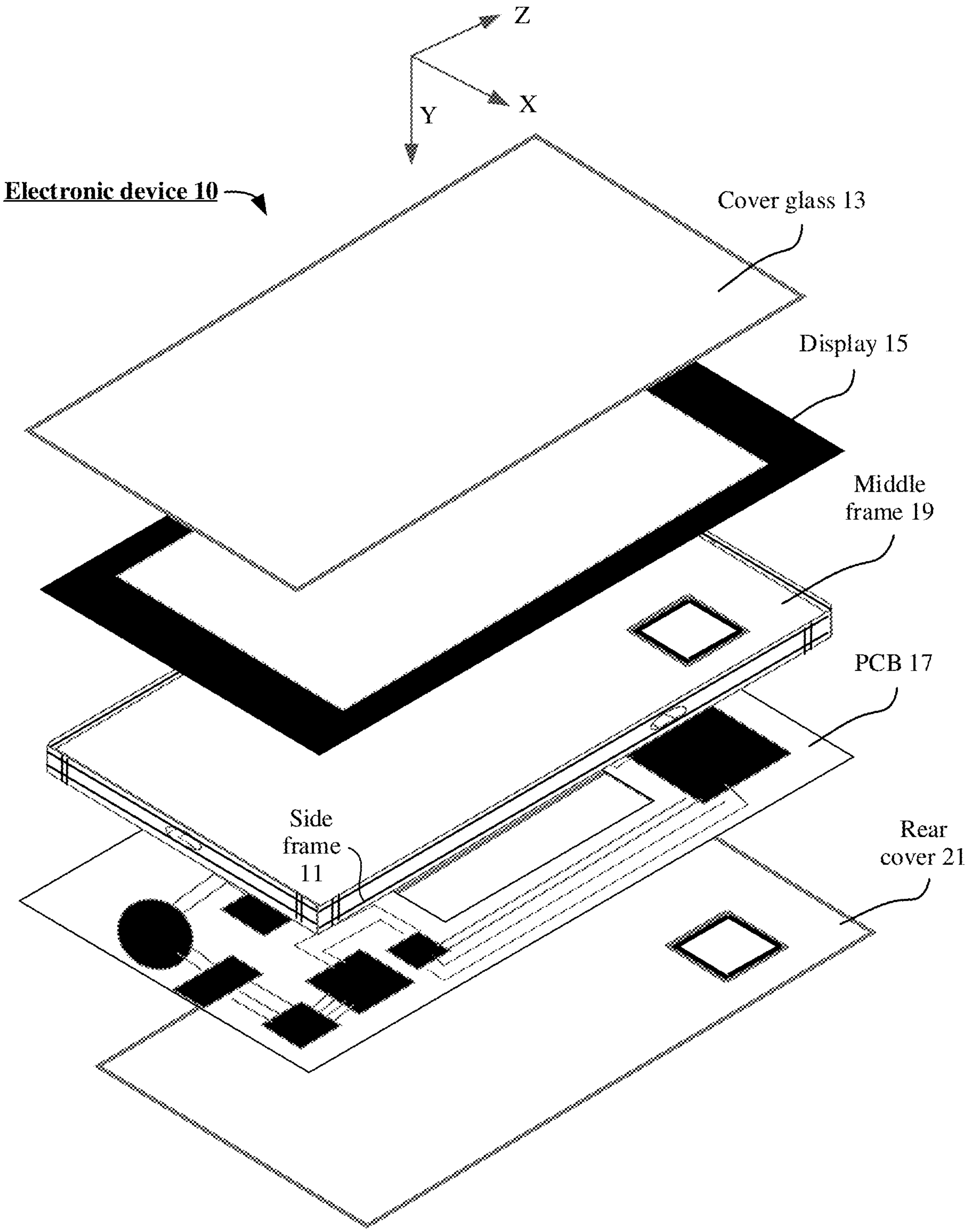
FIG. 1 is a schematic diagram of an electronic device according to an embodiment of this application.

The following describes technical solutions in embodiments of this application with reference to accompanying drawings.

It should be understood that, in embodiments of this application, an "electrical connection" may be understood as a form in which components are physically in contact and are electrically conducted, or may be understood as a form in which different components in a line structure are connected by using physical lines that can transmit an electrical signal, such as a printed circuit board (printed circuit board, PCB) copper foil or a conducting wire, or may be understood as a form of performing mid-air electrical conduction in an indirect coupling manner. "Coupling" may be understood as a form of performing mid-air electrical conduction in an indirect coupling manner. A person skilled in the art may understand that a coupling phenomenon refers to a phenomenon that close cooperation and mutual influence exist between inputs and outputs of two or more circuit elements or electrical networks, and energy is transmitted from one side to another side through interaction. Both "connect" and "interconnect" may mean a mechanical connection relationship or a physical connection relationship. For example, that A is connected to B or A is interconnected to B may mean that a fastening component (like a screw, a bolt, a rivet) exists between A and B, or that A and B are in contact with each other and are difficult to be separated.

Antenna gain: The antenna gain is a ratio of a power density of a signal generated by an actual antenna to a power density of a signal generated by an ideal radiation element (the ideal radiation element does not exist, and is replaced by a dipole (dipole) antenna during actual application) at a same point in space when input power is the same. The antenna gain describes how strong an antenna radiates an input power in a specified direction.

Horizontal polarization and vertical polarization of an antenna: At a fixed point in space, electric field strength E (a vector) is a unary function of time t. A vector endpoint periodically depicts a trajectory in space over time. That the trajectory is perpendicular to the ground (a plane on which a ground is located) is known as vertical polarization. That the trajectory is horizontal to the ground is known as horizontal polarization. In addition, because vibration directions of a horizontally polarized electromagnetic wave and a vertically polarized electromagnetic wave are perpendicular to each other, coupling between the horizontally polarized electromagnetic wave and the vertically polarized electromagnetic wave is low, and isolation between the horizontally polarized electromagnetic wave and the vertically polarized electromagnetic wave is good.

Antenna return loss: The antenna return loss may be understood as a ratio of a power of a signal reflected back to an antenna port by an antenna circuit to a transmit power of the antenna port. A smaller reflected signal indicates a larger signal radiated to space through an antenna and indicates higher radiation efficiency of the antenna. A larger reflected signal indicates a smaller signal radiated to space through the antenna and indicates lower radiation efficiency of the antenna.

The antenna return loss may be represented by using an S11 parameter, and S11 is one of S parameters. S11 indicates a reflection coefficient, and this parameter can indicate a level of transmit efficiency of the antenna. The S11 parameter is usually a negative number. A smaller S11 parameter indicates a smaller antenna return loss and less energy reflected back by the antenna. In other words, a smaller S11 parameter indicates more energy that actually enters the antenna and higher antenna system efficiency. A larger S11 parameter indicates a larger antenna return loss and lower antenna system efficiency.

It should be noted that, in engineering, an S11 value of −4 dB is generally used as a standard. When an S11 value of the antenna is less than −4 dB, it may be considered that the antenna can operate normally, or it may be considered that transmit efficiency of the antenna is good.

Ground (ground): The ground (ground) may generally refer to at least a part of any ground plane, or ground plate, or ground metal layer in an electronic device (like a mobile phone), or at least a part of any combination of any ground plane, or ground plate, or ground component. The "ground" may be used to ground a component in the electronic device. In an embodiment, the "ground" may be a ground plane of a circuit board of an electronic device, or may be a ground metal layer formed by a ground plate formed using a middle frame of the electronic device or a metal thin film below a screen in the electronic device. In an embodiment, the circuit board may be a printed circuit board (printed circuit board, PCB), for example, an 8-layer, 10-layer, or 12-layer to 14-layer board having 8, 10, 12, 13, or 14 layers of conductive materials, or an element that is separated by a dielectric layer or an insulation layer like glass fiber or polymer and that is electrically insulated. In an embodiment, the circuit board includes a dielectric substrate, a ground plane, and a wiring layer. The wiring layer and the ground plane are electrically connected through a via. In an embodiment, components such as a display, a touchscreen, an input button, a transmitter, a processor, a memory, a battery, a charging circuit, and a system on chip (system on chip, SoC) structure may be installed on or connected to the circuit board, or electrically connected to the wiring layer and/or the ground plane in the circuit board. For example, a radio frequency source is disposed at the wiring layer.

Any of the foregoing ground plane, or ground plate, or ground metal layer is made of a conductive material. In an embodiment, the conductive material may be any one of the following materials: copper, aluminum, stainless steel, brass and alloys thereof, copper foils on insulation laminates, aluminum foils on insulation laminates, gold foils on insulation laminates, silver-plated copper, silver-plated copper foils on insulation laminates, silver foils on insulation laminates and tin-plated copper, cloth impregnated with graphite powder, graphite-coated laminates, copper-plated laminates, brass-plated laminates, and aluminum-plated laminates. A person skilled in the art may understand that the ground plane/ground plate/ground metal layer may alternatively be made of another conductive material.

The technical solutions provided in embodiments of this application are applicable to an electronic device that uses one or more of the following communication technologies: a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, and other future communication technologies. The electronic device in embodiments of this application may be a mobile phone, a tablet computer, a notebook computer, a smart household, a smart band, a smart watch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, an electronic device in a 5G network, an electronic device in a future evolved public land mobile network (public land mobile network, PLMN), or the like. This is not limited in embodiments of this application. FIG. 1 shows an example of an electronic device provided in an embodiment of this application. An example in which the electronic device is a mobile phone is used for description.

As shown in FIG. 1, an electronic device 10 may include a cover (cover) 13, a display/module (display) 15, a printed circuit board (printed circuit board, PCB) 17, a middle frame (middle frame) 19, and a rear cover (rear cover) 21. It should be understood that, in some embodiments, the cover 13 may be a cover glass (cover glass), or may be replaced with a cover of another material, for example, a cover of an ultra-thin glass material or a cover of a PET (Polyethylene terephthalate, polyethylene terephthalate) material.

The cover 13 may be disposed close to the display module 15, and may be mainly used to protect the display module 15 for dust resistance.

In an embodiment, the display module 15 may include a liquid crystal display (liquid crystal display, LCD) panel, a light-emitting diode (light-emitting diode, LED) display panel, an organic light-emitting diode (organic light-emitting diode, OLED) display panel, or the like. This is not limited in this application.

The middle frame 19 is mainly used to support the electronic device. As shown in FIG. 1, the PCB 17 is disposed between the middle frame 19 and the rear cover 21. It should be understood that, in an embodiment, the PCB 17 may alternatively be disposed between the middle frame 19 and the display module 15. This is not limited in this application. The printed circuit board PCB 17 may be a flame-resistant material (FR-4) dielectric board, or may be a Rogers (Rogers) dielectric board, or may be a hybrid dielectric board of Rogers and FR-4, or the like. Herein, FR-4 is a grade designation for a flame-resistant material, and the Rogers dielectric board is a high-frequency board. An electronic element, for example, a radio frequency chip, is carried on the PCB 17. In an embodiment, a metal layer may be disposed on the printed circuit board PCB 17. The metal layer may be used to ground the electronic element carried on the printed circuit board PCB 17, or may be used to ground another element, for example, a support antenna or a side frame antenna. The metal layer may be referred to as a ground, a ground plate, or a ground plane. In an embodiment, the metal layer may be formed by etching metal on a surface of any dielectric board in the PCB 17. In an embodiment, the metal layer used for grounding may be disposed on a side that is of the printed circuit board PCB 17 and that is close to the middle frame 19. In an embodiment, an edge of the printed circuit board PCB 17 may be considered as an edge of the ground plane of the printed circuit board PCB 17. In an embodiment, the metal middle frame 19 may also be configured to ground the foregoing element. The electronic device 10 may further have another ground/ground plate/ground plane, as described above. Details are not described herein again.

The electronic device 10 may further include a battery (not shown in the figure). The battery may be disposed between the middle frame 19 and the rear cover 21, or may be disposed between the middle frame 19 and the display module 15. This is not limited in this application. In some embodiments, the PCB 17 is divided into a mainboard and a sub-board. The battery may be disposed between the mainboard and the sub-board. The mainboard may be disposed between the middle frame 19 and an upper edge of the battery, and the sub-board may be disposed between the middle frame 19 and a lower edge of the battery.

The electronic device 10 may further include a side frame 11, and the side frame 11 may be made of a conductive material like metal. The side frame 11 may be disposed between the display module 15 and the rear cover 21, and extend around a periphery of the electronic device 10. The side frame 11 may have four sides surrounding the display module 15, to help fasten the display module 15. In an implementation, the side frame 11 made of a metal material may be directly used as a metal side frame of the electronic device 10 to form an appearance of the metal side frame, and is applicable to a metal industrial design (industrial design, ID). In another implementation, an outer surface of the side frame 11 may alternatively be made of a non-metal material, for example, may be a plastic frame, to form an appearance of the non-metal side frame, and is applicable to a non-metal ID.

The middle frame 19 may include the side frame 11, and the middle frame 19 including the side frame 11 is used as an integrated component, and may support an electronic component in the electronic device. The cover 13 and the rear cover 21 are respectively covered along an upper edge and a lower edge of the side frame, to form a casing or a housing (housing) of the electronic device. In an embodiment, the cover 13, the rear cover 21, the side frame 11, and/or the middle frame 19 may be collectively referred to as a casing or a housing of the electronic device 10. It should be understood that the "casing or housing" may mean a part or all of any one of the cover 13, the rear cover 21, the side frame 11, or the middle frame 19, or mean a part or all of any combination of the cover 13, the rear cover 21, the side frame 11, or the middle frame 19.

Alternatively, the side frame 11 may be not considered as a part of the middle frame 19. In an embodiment, the side frame 11 and the middle frame 19 may be connected and integrally formed. In another embodiment, the side frame 11 may include a protruding part extending inwards, to be connected to the middle frame 19 by using a spring or a screw, through welding, or the like. The protruding part of the side frame 11 may be further configured to receive a feed signal, so that at least a part of the side frame 11 is used as a radiator of an antenna to receive/transmit a radio frequency signal. A slot 42 may exist between the middle frame 30 and the part of the side frame that serves as the radiator, to ensure that the radiator of the antenna has a good radiation environment, and the antenna has a good signal transmission function.

The rear cover 21 may be a rear cover made of a metal material, or may be a rear cover made of a non-conductive material, for example, a glass rear cover, a plastic rear cover, or another non-metallic rear cover.

FIG. 1 shows only an example of some components included in the electronic device 10. Actual shapes, actual sizes, and actual structures of these components are not limited to those in FIG. 1.

It should be understood that, in embodiments of this application, it may be considered that a surface on which the display of the electronic device is located is a front surface, a surface on which the rear cover is located is a rear surface, and a surface on which the side frame is located is a side surface.

It should be understood that, in embodiments of this application, it is considered that, when a user holds the electronic device (the user usually holds the electronic device vertically and faces the screen), a position in which the electronic device is located has a top part, a bottom part, a left part, and a right part.

With rapid development of wireless communication technologies, a second generation (second generation, 2G) mobile communication system mainly supports a call function, an electronic device is only a tool used by people to send and receive text messages and perform voice communication, and a wireless network access function is very slow because data is transmitted through a voice channel. With development of a fifth generation (fifth generation, 5G) mobile communication system, low frequencies of a radio spectrum tend to be saturated. However, a millimeter-wave band has abundant spectrum resources. Therefore, millimeter waves can provide a solution for high-speed wireless communication, and has a low latency and high reliability.

To better receive and transmit signals, a millimeter-wave antenna in an electronic device needs to have dual-polarization performance, to receive communication information from different directions. In addition, because space of the electronic device is limited, an antenna structure that is not compact enough causes an increase in a size of the electronic device. This imposes a strict requirement on a miniaturization design of the antenna.

Figure 2:
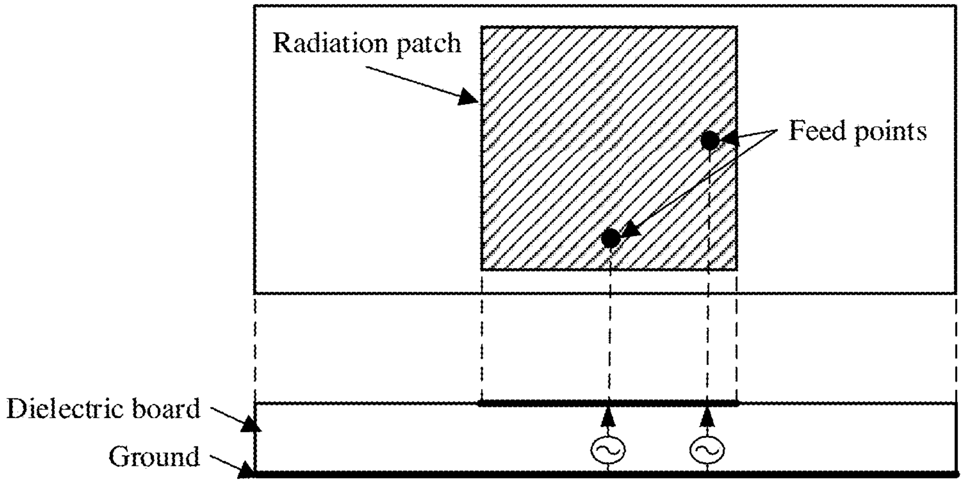
FIG. 2 is a schematic diagram of a structure of a millimeter-wave antenna according to an embodiment of this application.

FIG. 2 is a schematic diagram of a structure of a millimeter-wave antenna according to an embodiment of this application.

In the millimeter-wave antenna shown in FIG. 2, two feed points that are disposed on a radiation patch may be used to respectively generate polarized radiation in two directions, for example, horizontally polarized radiation and vertically polarized radiation, so that the millimeter-wave antenna can be used in a multi-input multi-output (multi-input multi-output, MIMO) system.

In the antenna structure shown in FIG. 2, a width of the radiation patch is approximately 0.4 operating wavelengths, and a relative bandwidth of the antenna structure is approximately 10%.

Figure 3A:
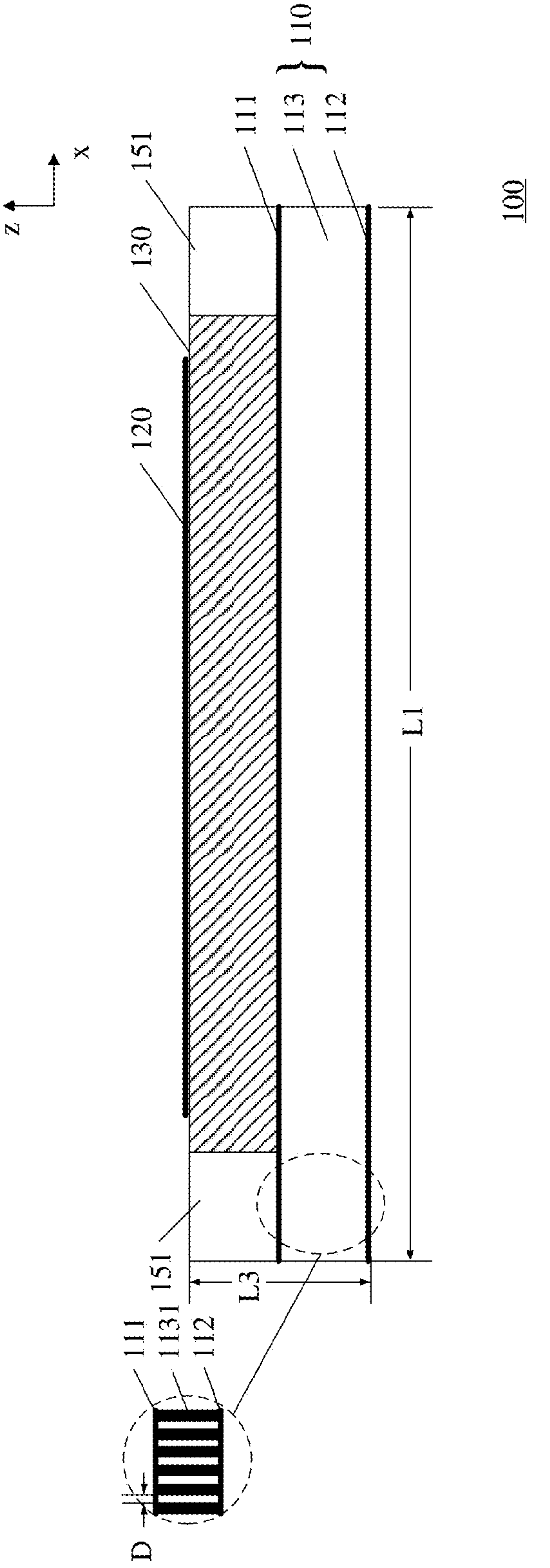
FIG. 3(*a*) to FIG. 3(*c*) show different views of an antenna structure 100 according to an embodiment of this application.
Figure 3B:
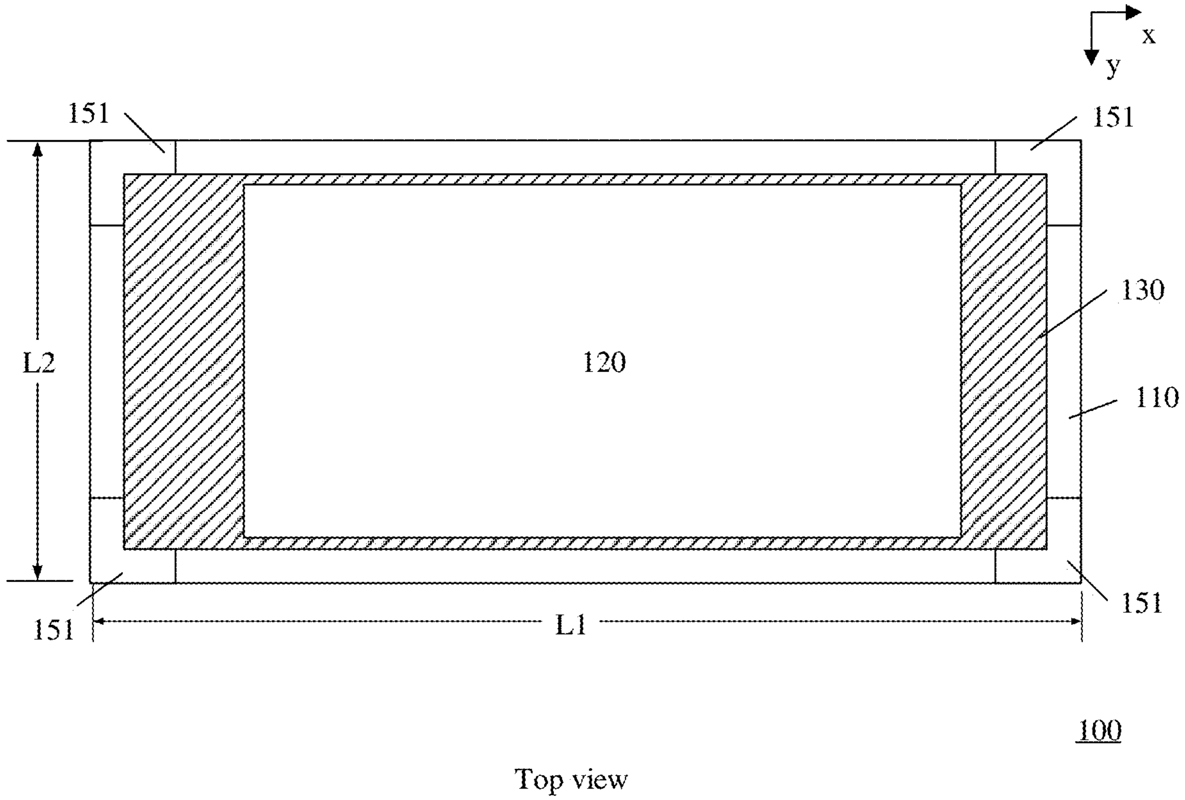
Figure 3C:
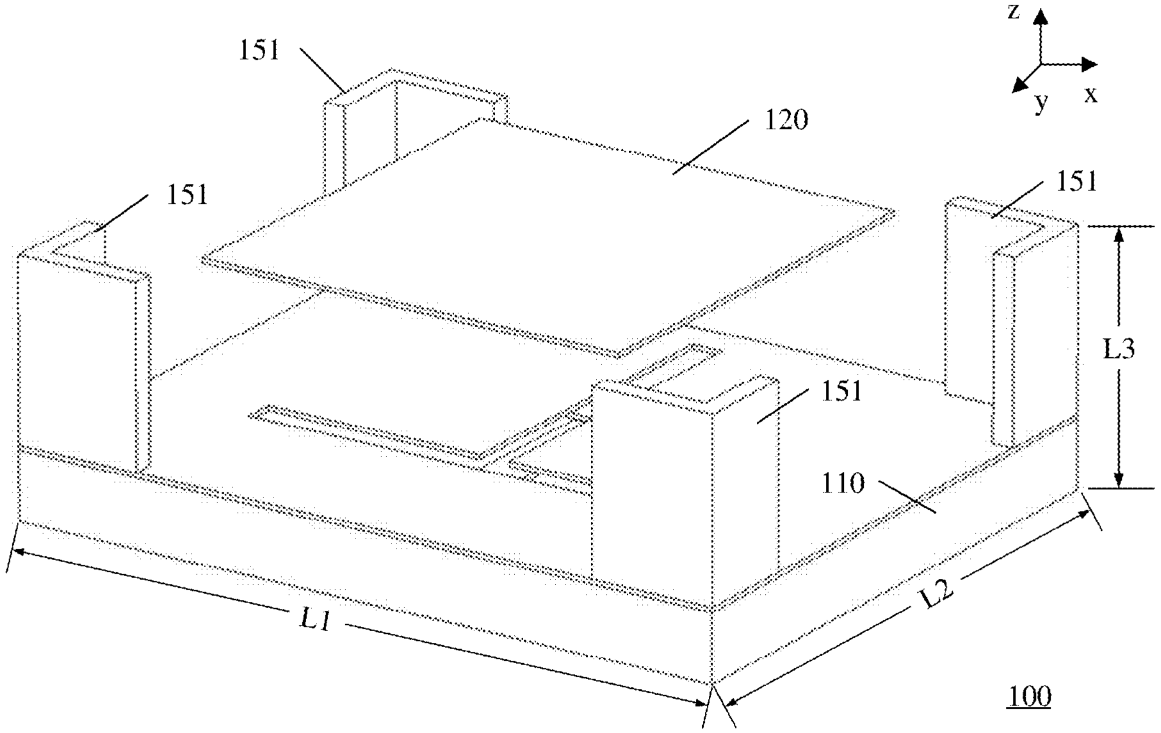
Figure 4:
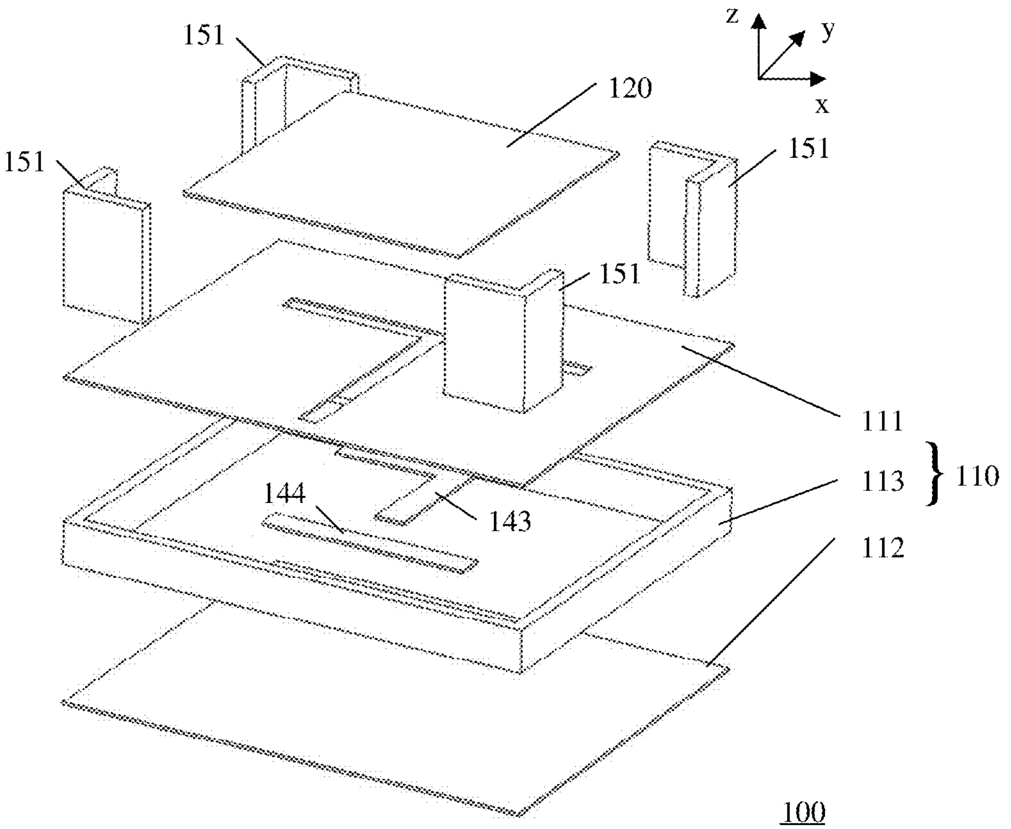
FIG. 4 is an exploded view of an antenna structure 100 according to an embodiment of this application.
Figure 5:
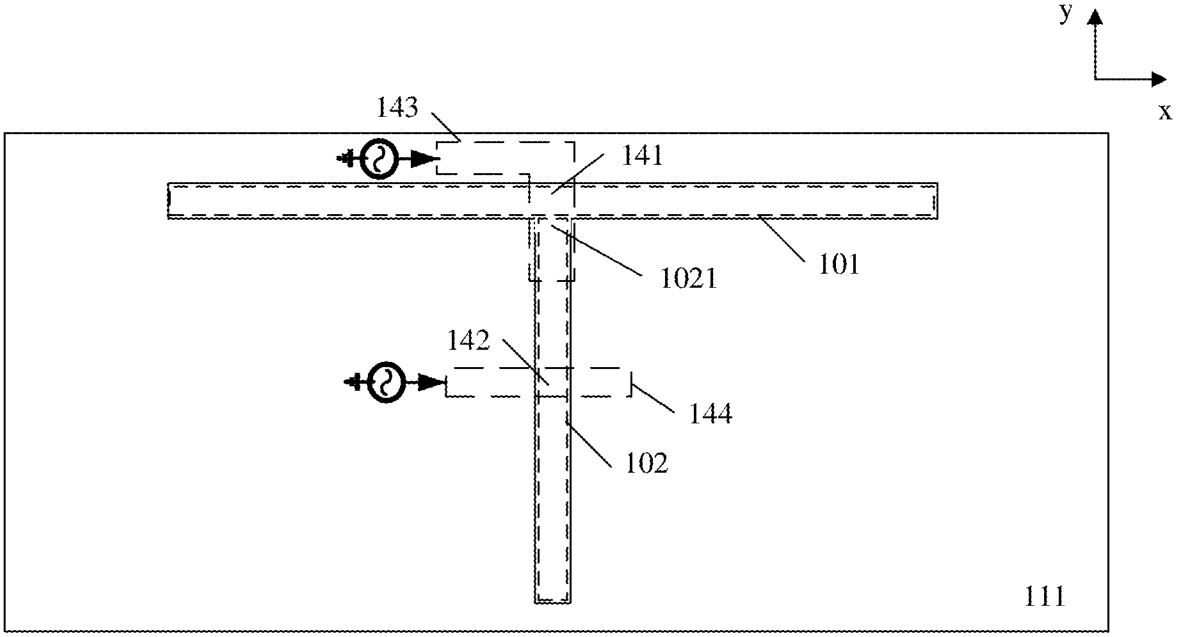
FIG. 5 is a schematic diagram of a first metal layer 11 according to an embodiment of this application.

FIG. 3(*a*) to FIG. 5 are schematic diagrams of a structure of an antenna structure 100 according to embodiments of this application. The antenna structure 100 may be used in the electronic device shown in FIG. 1. FIG. 3(*a*) to FIG. 3(*c*) show different views of the antenna structure 100 according to an embodiment of this application. FIG. 4 is an exploded view of the antenna structure 100 according to an embodiment of this application. FIG. 5 is a schematic diagram of a first metal layer according to an embodiment of this application.

According to the antenna structure provided in embodiments of this application, horizontally polarized radiation and vertically polarized radiation may be respectively generated by using slots provided on a metal cavity of the antenna structure. In addition, a radiator disposed above the slot may expand an operating bandwidth of the antenna structure, so that an operating frequency band of the antenna structure includes more communication frequency bands. A width of the antenna structure provided in embodiments of this application may be less than a width of a side frame of the electronic device, thereby facilitating application in the electronic device.

As shown in FIG. 3(*a*) to FIG. 3(*c*), the antenna structure 100 may include a metal cavity 110 and a first radiator 120.

The metal cavity 110 includes a first metal layer 111 and a second metal layer 112 that are disposed opposite to each other, and a metal wall 113 that connects the first metal layer 111 and the second metal layer 112, as shown in FIG. 3(*a*). The metal wall 113 is separately connected to the first metal layer 11 and the second metal layer 112. In an embodiment, the metal wall 113 is connected to the first metal layer 111 and the second metal layer 112 respectively at an edge of the first metal layer 111 and an edge of the second metal layer 112. In an embodiment, the first metal layer 111, the second metal layer 112, and the metal wall 113 enclose the metal cavity 110. In an embodiment, a closed cavity structure is formed by using the first metal layer 111, the second metal layer 112, and the metal wall 113, as shown in FIG. 4. In an embodiment, the first radiator and the metal cavity are disposed opposite to each other and are spaced apart, and the first radiator 120 is located on a side that is of the first metal layer 111 and that is away from the second metal layer 112. In an embodiment, the first radiator 120 is disposed above the first metal layer 111.

In an embodiment, the antenna structure 100 may further include a first dielectric board 130. In an embodiment, the first dielectric board 130 is disposed between the metal cavity 110 and the first radiator 120, and a side of the first dielectric board 130 is in contact with the first metal layer 111 and is configured to support the first radiator 120.

As shown in FIG. 5, a first slot 101 and a second slot 102 are provided on the first metal layer 111. A first end 1021 of the second slot 102 is connected to the first slot 101, so that the first slot 101 communicates with the second slot 102. A first feed point 141 is disposed in the first slot 101, a second feed point 142 is disposed in the second slot 102, and both the first feed point 141 and the second feed point 142 are configured for feeding the antenna structure, so that the antenna structure generates a resonance. In an embodiment, the first slot 101 and the second slot 102 form a closed slot or a sealed slot. In an embodiment, neither the first slot 101 nor the second slot 102 extends to the edge of the first metal layer 11.

In an embodiment, projections of the first slot 101, the second slot 102, and the first radiator 120 in a first direction at least partially overlap, and the first direction is a direction perpendicular to the first metal layer 11. In an embodiment, in the schematic diagram of the antenna structure 100 shown in FIG. 3(*a*) to FIG. 3(*c*), the first direction is a z direction.

In the antenna structure provided in embodiments of this application, the second metal layer is used as a ground of the antenna structure. In addition, a T-shaped slot provided on the first metal layer may be used to generate electromagnetic waves in two different polarization directions when feeding is performed at the first feed point and the second feed point, for example, a horizontally polarized electromagnetic wave and a vertically polarized electromagnetic wave. Because the horizontally polarized electromagnetic wave and the vertically polarized electromagnetic wave are orthogonal to each other, coupling between the horizontally polarized electromagnetic wave and the vertically polarized electromagnetic wave can be greatly reduced, so that isolation between the horizontally polarized electromagnetic wave and the vertically polarized electromagnetic wave is higher. Therefore, the antenna structure may be used in a MIMO system. In addition, the first radiator is disposed in the antenna structure, and may be in a coupling connection to the T-shaped slot to generate an additional resonant frequency band for expanding an operating frequency band of the antenna structure, so that the antenna structure is used in more communication frequency bands.

It should be understood that, in embodiments of this application, for brevity of description, only an example in which the first metal layer 111 and the second metal layer 112 are rectangular is used for description, that is, the metal cavity 110 is a cuboid. During actual application, adjustment may be performed based on internal space or a design requirement of the electronic device. For example, the first metal layer in and the second metal layer 112 may be triangular or circular. This is not limited in this application. Likewise, the first radiator 120 may alternatively be in any shape, for example, may be a rectangle, a circle, or a triangle. This is not limited in this application.

In an embodiment, the metal wall 113 may be referred to as a short-circuit metal wall. The metal wall 113 is disposed between the first metal layer in and the second metal layer 112. One side of the metal wall 113 is connected to the first metal layer in along the edge of the first metal layer in, and the other side of the metal wall 113 is connected to the second metal layer 112 along the edge of the second metal layer 112, so that space between the first metal layer in and the second metal layer 112 is closed in a circumferential direction of the space, to enclose the closed metal cavity 110.

In an embodiment, the short-circuit metal wall 113 may include a plurality of metal through holes 1131, one end of each of the plurality of metal through holes 1131 is electrically connected to the first metal layer 111, and the other end of each metal through hole is electrically connected to the second metal layer 112, as shown in FIG. 3(*a*). When a distance D between any two adjacent metal through holes in the plurality of metal through holes 1131 is less than a first threshold, it may be considered that the plurality of metal through holes 1131 form the metal wall 113, and space between the first metal layer 111 and the second metal layer 112 is closed in a circumferential direction of the space, to form the closed metal cavity 110. A higher frequency of the operating frequency band of the antenna structure indicates a smaller first threshold, and a higher frequency of the operating frequency band of the antenna structure indicates a shorter distance between any two adjacent metal through holes in the plurality of metal through holes 1131. Alternatively, a smaller hole diameter of the metal through hole 1131 indicates a smaller first threshold, and a smaller hole diameter of the metal through hole 1131 indicates a shorter distance between any two adjacent metal through holes in the plurality of metal through holes 1131. For example, in n257 and n258 (24.25 GHz to 29.5 GHz) frequency bands, when a hole diameter of the metal through hole 1131 is 0.075 mm, the first threshold may be 0.2 mm.

In an embodiment, an extension direction of the first slot 101 may be perpendicular to an extension direction of the second slot 102. The extension direction of the first slot 101 may be understood as a length direction of the first slot 101, and the extension direction of the second slot 102 may also be understood correspondingly. Because space inside the electronic device becomes smaller, setting of the antenna structure needs to be adjusted based on the internal space of the electronic device. It should be noted that qualifiers related to a relative position relationship such as “parallel” and “perpendicular” mentioned in embodiments of this application are all for a current process level, but are not absolute and strict definitions in a mathematical sense. A small deviation is allowed, so that “approximately parallel” and “approximately perpendicular” are acceptable. For example, in an embodiment, that A and B are parallel to each other means that A and B are parallel or approximately parallel to each other. In an embodiment, that A and B are parallel to each other means that an included angle between A and B is between 0 degrees and 10 degrees. In an embodiment, that A and B are perpendicular to each other means that A and B are perpendicular or approximately perpendicular to each other. In an embodiment, that A and B are perpendicular to each other means that an included angle between A and B is between 80 degrees and 100 degrees.

In an embodiment, the first feed point 141 may be disposed at a joint of the first slot 101 and the second slot 102.

In an embodiment, the first feed point 141 may be disposed in a central region of the first slot 101, and the first slot 101 has a same length on two sides of the first feed point 141. It should be understood that, as symmetry of the antenna structure 100 increases, a radiation characteristic of the antenna structure 100 can be improved.

In an embodiment, a first feed unit and a second feed unit may feed the antenna structure 100 at the first feed point 141 and the second feed point 142 in a coupled feeding manner, so that an operating frequency band of the antenna structure 100 can be expanded. In an embodiment, the antenna structure 100 may further include a first feed stub 143 and a second feed stub 144, as shown in FIG. 4. The first feed stub 143 and the second feed stub 144 may be disposed in the metal cavity 110. In an embodiment, projections of the first feed stub 143 and the first slot 101 in the first direction (z direction) at least partially overlap, the overlapping region includes the first feed point 141, and the first feed stub 143 are in a coupling connection to the first metal layer 111 at the first feed point 141, as shown in FIG. 5. In an embodiment, projections of the second feed stub 144 and the second slot 102 in the first direction (z direction) at least partially overlap, the overlapping region includes the second feed point 142, and the second feed stub 144 is in a coupling connection to the first metal layer 111 at the second feed point 142, as shown in FIG. 5. In an embodiment, an end of the first feed stub 143 and an end of the second feed stub 144 may be electrically connected to the first feed unit and the second feed unit respectively for feeding an electrical signal into the antenna structure 100.

In an embodiment, the antenna structure may further include a third dielectric board and a fourth dielectric board. At least a part of the third dielectric board and at least a part of the fourth dielectric board may be stacked in the metal cavity 110 in the first direction. The first feed stub 143 and the second feed stub 144 are disposed between the third dielectric board and the fourth dielectric board, so that the first feed stub 143 and the second feed stub 144 form a stripline-shaped structure, and lengths of the first feed stub 143 and the second feed stub 144 may be further reduced when it is ensured that electrical lengths of the first feed stub 143 and the second feed stub 144 remain unchanged. It should be understood that, in actual production or design, the metal cavity 110 may alternatively include more dielectric boards therein. This is not limited in this application.

In an embodiment, the second dielectric board and the third dielectric board may use a same dielectric material as the first dielectric board 130, or the first dielectric board 130, the second dielectric board, and the third dielectric board may use different dielectric materials. This is not limited in this application.

The electrical length may be represented by a product of a physical length (namely, a mechanical length or a geometric length) of a medium and a ratio, where the ratio is time that an electrical or electromagnetic signal is transmitted in the medium to time required when the signal passes through a distance the same as the physical length of the medium in free space, and the electrical length may satisfy the following formula:

$$\overline{L} = L \times \frac{a}{b},$$

L is the physical length, a is transmission time of the electrical or electromagnetic signal in the medium, and b is transmission time in free space.

Alternatively, the electrical length may be a ratio of a physical length (namely, a mechanical length or a geometric length) to a wavelength of a transmitted electromagnetic wave. The electrical length may satisfy the following formula:

$$\overline{L} = \frac{L}{\lambda},$$

where

L is the physical length, and λ is an operating wavelength of the electromagnetic wave.

In an embodiment, the first feed stub 143 is L-shaped, and the second feed stub 144 is straight line-shaped. It should be understood that the L shape or straight-line shape is only used as a main body shape of the feed stub, or a recess part or a protrusion part may be disposed in a partial region of the feed stub. Specific shapes of the first feed stub 143 and the second feed stub 144 are not limited in this application. For example, the first feed stub 143 and the second feed stub 144 may be in a regular or an irregular shape like a rectangle, a circle, a fold line, or a fish fork. The specific shapes of the first feed stub 143 and the second feed stub 144 may be adjusted based on a shape or design requirement of the metal cavity 110.

In the foregoing embodiment, the first feed unit and the second feed unit feed the antenna structure 100 at the first feed point 141 and the second feed point 142 in a coupled feeding manner. In an embodiment, the first feed unit and the second feed unit may feed the antenna structure 100 at the first feed point 141 and the second feed point 142 in a direct feeding manner. In an embodiment, the first feed unit may be electrically connected to conductors on the two sides of the first slot 101 at the first feed point 141. The second feed unit may be electrically connected to conductors on two sides of the second slot 102 at the second feed point 142.

In an embodiment, the first feed unit and the second feed unit may be different radio frequency channels in a radio frequency chip disposed inside the antenna structure 100.

In an embodiment, the antenna structure 100 further includes at least one metal post 151, as shown in FIG. 4. In an embodiment, the metal post 151 may be disposed on the first dielectric board 130, and an end of the metal post 151 is electrically connected to the first metal layer 111. In an embodiment, the metal post 151 may be referred to as a matching metal post, and the metal post 151 may be disposed on a side surface (a surface in a thickness direction of the first dielectric board, for example, a surface in the z direction) of the first dielectric board 130 or disposed inside the first dielectric board 130 in a form of metal through hole. In an embodiment, the first radiator 120 and the metal post 141 are separately disposed on a surface of the first dielectric board 130. In an embodiment, the metal post 141 is disposed on any side around the first radiator 120, and is not connected to the first radiator 120. For example, in the antenna structure shown in FIG. 4, the first radiator 141 is disposed on a surface that is of the first dielectric board 130 and that is away from the metal cavity 110, the metal post 141 may be a bent structure, and two bent parts of the metal post 141 are respectively disposed on adjacent side surfaces of the first dielectric board 130. In an embodiment, when the antenna structure 100 includes a plurality of metal posts 141, the plurality of metal posts 141 are respectively disposed at different positions around the first radiator 120, so that the first radiator 120 is disposed in virtual space enclosed by the plurality of metal posts 131. At least one metal post 151 may be configured to extend a ground (the second metal layer 112) of the antenna structure 100, and increase a current path on the ground, to reduce impact caused by an excessively small ground area on impedance of the antenna structure 100 (an electromagnetic wave generated by a current on the ground cannot be restrained due to the excessively small ground area, thereby causing interference to an electromagnetic wave of an operating frequency band of the antenna structure), thereby improving a radiation characteristic (for example, an operating bandwidth) of the antenna structure 100.

It should be understood that this application is described by using only an example in which the antenna structure includes four matching metal posts 151 disposed at four corners of the first dielectric board 130. In actual production or design, a quantity of matching metal posts 151 included in the antenna structure 100 and positions of the matching metal posts 151 may be adjusted. This is not limited in this application.

In an embodiment, an operating frequency band of the antenna structure 100 may include n257 and n258 frequency bands (24.25 GHz to 29.5 GHz). In actual design or production, adjustment may be performed according to an actual requirement. This is not limited in this application.

In an embodiment, the antenna structure 100 may further include a casing, and the metal cavity 110, the first radiator 120, and the first dielectric board 130 may be disposed in space enclosed by the casing.

Figure 6A:
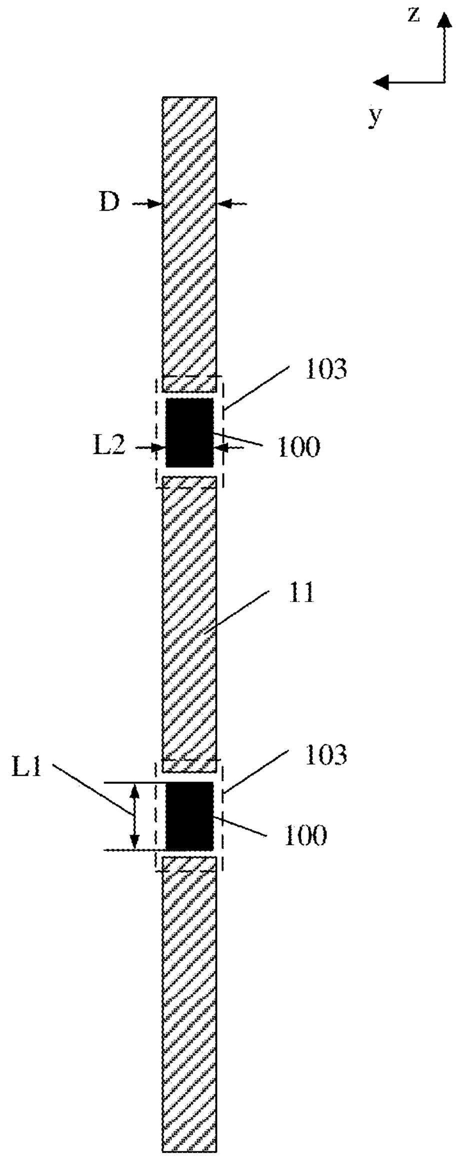
FIG. 6(*a*) and FIG. 6(*b*) are a schematic diagram of a side frame of an electronic device according to an embodiment of this application.
Figure 6B:
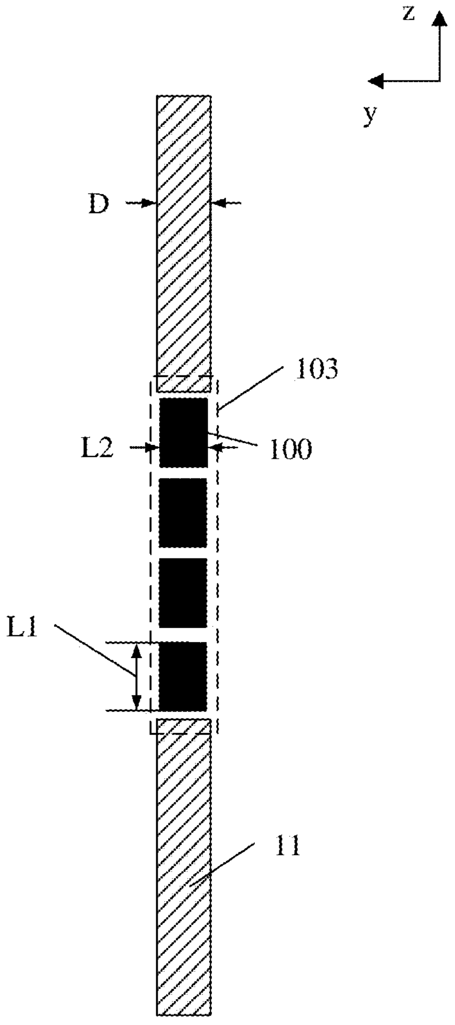

In an embodiment, the side frame 11 of the electronic device may be provided with at least one third slot 103, as shown in FIG. 6(*a*) and FIG. 6(*b*). At least a part of the antenna structure 100 may be disposed in the third slot 103. That the antenna structure 100 is disposed in the third slot 103 may be understood as that at least a part of the antenna structure 100 is disposed between conductors on two sides of the slot 103. In an embodiment, the antenna structure 100 is at least partially embedded into the side frame 11. A width L2 of the antenna structure 100 is less than a width of the side frame 11, so that the antenna structure 100 may be disposed in the third slot 103 provided on the side frame 11. Therefore, a key size in the miniaturized antenna structure 100 is the width L2. For an increasingly thin electronic device, the width L2 of the antenna structure 100 may be less than 0.3 low-frequency wavelengths. For example, the low-frequency wavelength may be a wavelength corresponding to a lowest frequency of an operating frequency band. For example, the antenna structure 100 operates on n257 and n258 frequency bands, and the width L2 of the antenna structure 100 may be less than 3.5 mm. It should be understood that the electronic device may include a plurality of antenna structures 100. The plurality of antenna structures 100 may be separately disposed in different third slots 103, and the plurality of antenna structures 100 are in a one-to-one correspondence with the plurality of third slots 103, as shown in FIG. 6(*a*). Alternatively, the plurality of antenna structures 100 may be disposed in one third slot, as shown in FIG. 6(*b*). This is not limited in this application.

In an embodiment, a length L1 of the antenna structure 100 may be less than 0.4 low-frequency wavelengths. For example, the antenna structure 100 operates on n257 and n258 frequency bands, and the length L1 of the antenna structure 100 may be less than 4.5 mm, so that a length of the side frame occupied by disposing a same quantity of antenna structures may be shorter.

In an embodiment, for example, the antenna structure 100 operates on the n257 and n258 frequency bands. The length L1 of the antenna structure 100 may be 3.5 mm, the width L2 of the antenna structure 100 may be 2.8 mm, and a height L3 of the antenna structure 100 may be 1 mm, as shown in FIG. 3(*c*).

Figure 7:
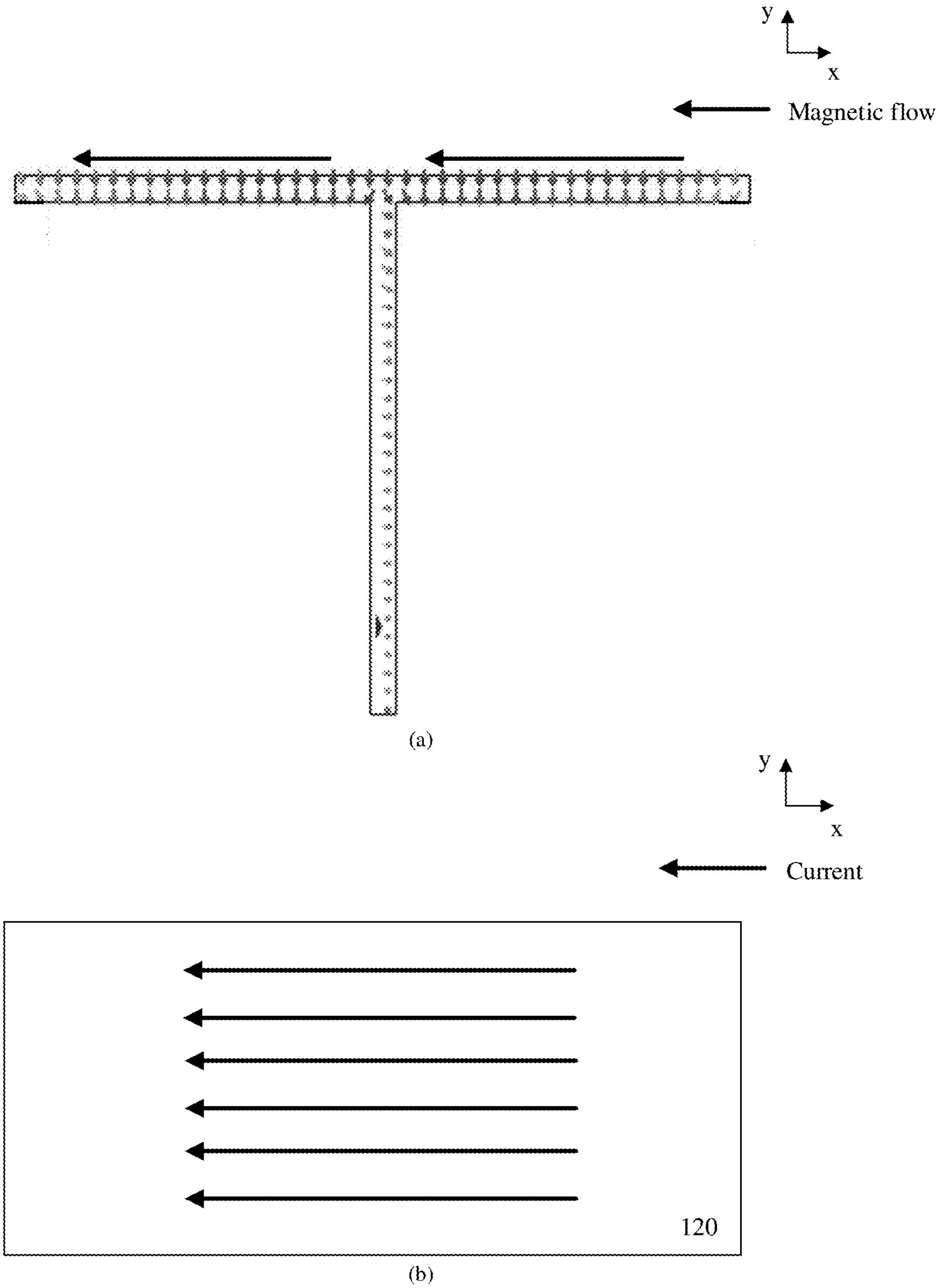
FIG. 7 is a schematic diagram of distribution of electric fields of the antenna structure 100 shown in FIG. 3(*a*) to FIG. 3(*c*) when a first feed unit performs feeding.
Figure 8:
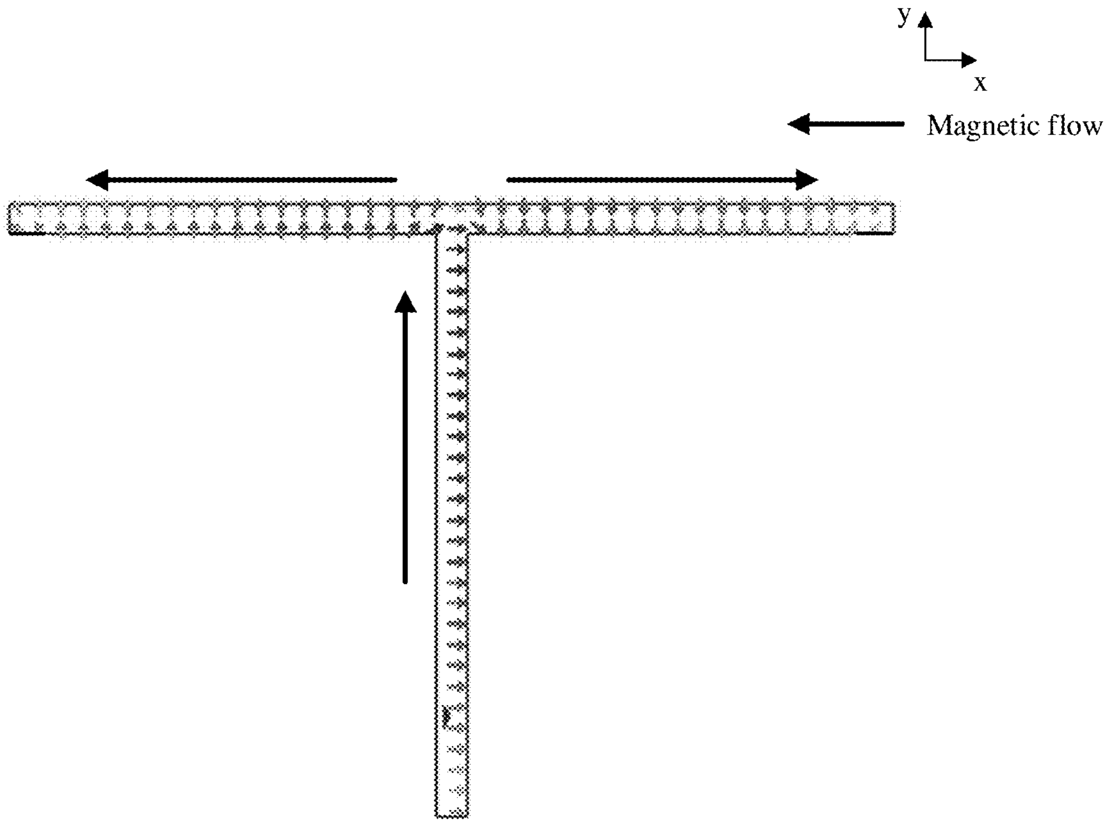
FIG. 8 is a schematic diagram of distribution of electric fields of the antenna structure 100 shown in FIG. 3(*a*) to FIG. 3(*c*) when a second feed unit performs feeding.
Figure 8:
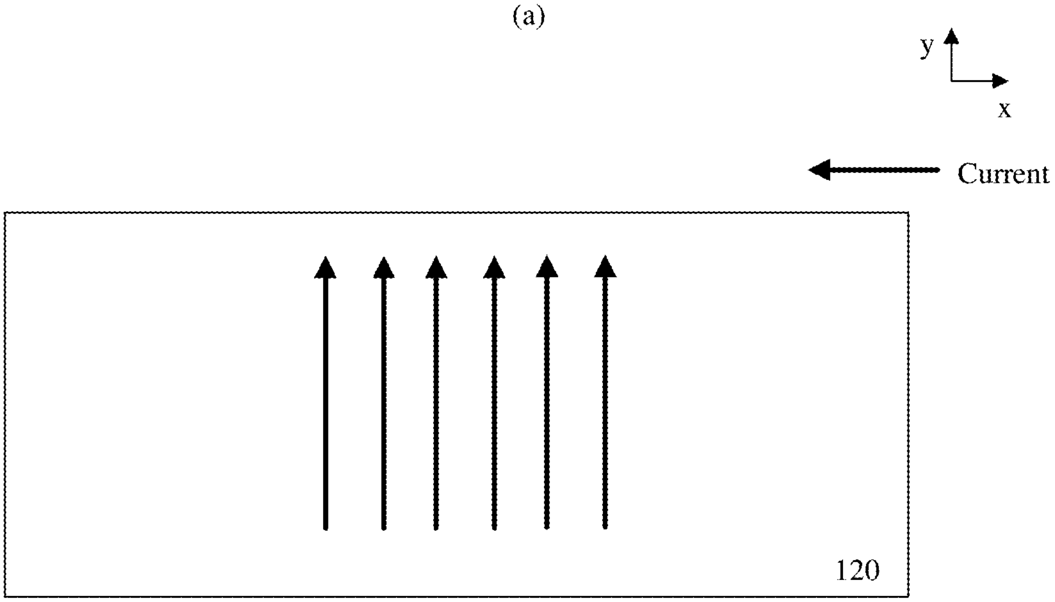

FIG. 7 and FIG. 8 are schematic diagrams of distribution of electric fields of the antenna structure 100 shown in FIG. 3(*a*) to FIG. 3(*c*). FIG. 7 is a schematic diagram of distribution of electric fields of the antenna structure 100 shown in FIG. 3(*a*) to FIG. 3(*c*) when a first feed unit performs feeding. FIG. 8 is a schematic diagram of distribution of electric fields of the antenna structure 100 shown in FIG. 3(*a*) to FIG. 3(*c*) when a second feed unit performs feeding.

As shown in (a) in FIG. 7, when the first feed unit performs feeding, magnetic flows in the T-shaped slot are anti-symmetrically distributed (the magnetic flows have same amplitudes, and have a phase difference of approximately 180°, for example, a phase difference of 180°±45°) in a direction y.

As shown in (b) in FIG. 7, when the first feed unit performs feeding, the first radiator is in a coupling connection to the T-shaped slot, and currents on the first radiator flow in an x direction (a majority (more than 70%) of the currents flow in the x direction at ±45° or 180°±45°), so that a first resonance frequency band may be generated. The first resonance frequency band generated by the first radiator may be used to expand an operating bandwidth of the antenna structure when the first feed unit performs feeding.

For distribution of electric fields and magnetic flows in the T-shaped slot shown in (a) in FIG. 7 and distribution of currents of the first radiator shown in (b) in FIG. 7, when the first feed unit performs feeding, a polarization manner of the antenna structure is horizontal polarization.

As shown in (a) in FIG. 8, when the second feed unit performs feeding, magnetic flows in the T-shaped slot are symmetrically distributed (the magnetic flows have same amplitudes, and have a phase difference of approximately 0°, for example, a phase difference of ±45°) in a direction y.

As shown in (b) in FIG. 8, when the second feed unit performs feeding, the first radiator is in a coupling connection to the T-shaped slot, and currents on the first radiator flow in a y direction (a majority (more than 70%) of the currents flow in the y direction at ±45° or 180°±45°), so that a second resonance frequency band may be generated. The second resonance frequency band generated by the first radiator may be used to expand an operating bandwidth of the antenna structure when the second feed unit performs feeding.

For distribution of electric fields and magnetic flows in the T-shaped slot shown in (a) in FIG. 8 and distribution of currents of the first radiator shown in (b) in FIG. 8, when the second feed unit performs feeding, a polarization manner of the antenna structure is vertical polarization.

It should be understood that, when the first feed unit and the second feed unit perform feeding, the antenna structure may separately generate a horizontally polarized electromagnetic wave and a vertically polarized electromagnetic wave. The horizontally polarized electromagnetic wave and the vertically polarized electromagnetic wave have a product of zero (are integrally orthogonal) in far field, and do not affect each other. Therefore, good isolation can be obtained between the horizontally polarized electromagnetic wave and the vertically polarized electromagnetic wave, and the antenna structure may be used in a MIMO system.

In addition, as shown in (a) in FIG. 7, when the first feed unit performs feeding, radiation generated by the T-shaped slot is mainly generated by the first slot. A physical length of the first slot may be a half of the first wavelength±10%, so that the antenna structure operates in a half wavelength mode by using the first slot. The first wavelength is a wavelength corresponding to an operating frequency band of the antenna structure. For example, the first wavelength may be a wavelength corresponding to a center frequency of the operating frequency band, or may be a wavelength corresponding to a frequency of a resonance point in the operating frequency band. As shown in (a) in FIG. 8, when the second feed unit performs feeding, radiation generated by the T-shaped slot is mainly generated by the second slot and is partially generated by the first slot. A physical length of the second slot may be a quarter of the first wavelength±10%, so that the antenna structure operates in a quarter wavelength mode by using the second slot. Because the electrical length of the second slot is less than a half of the first wavelength, the antenna structure is more compact in size (for example, in a width direction), which is more beneficial to disposing the antenna structure in the electronic device.

Figure 9A:
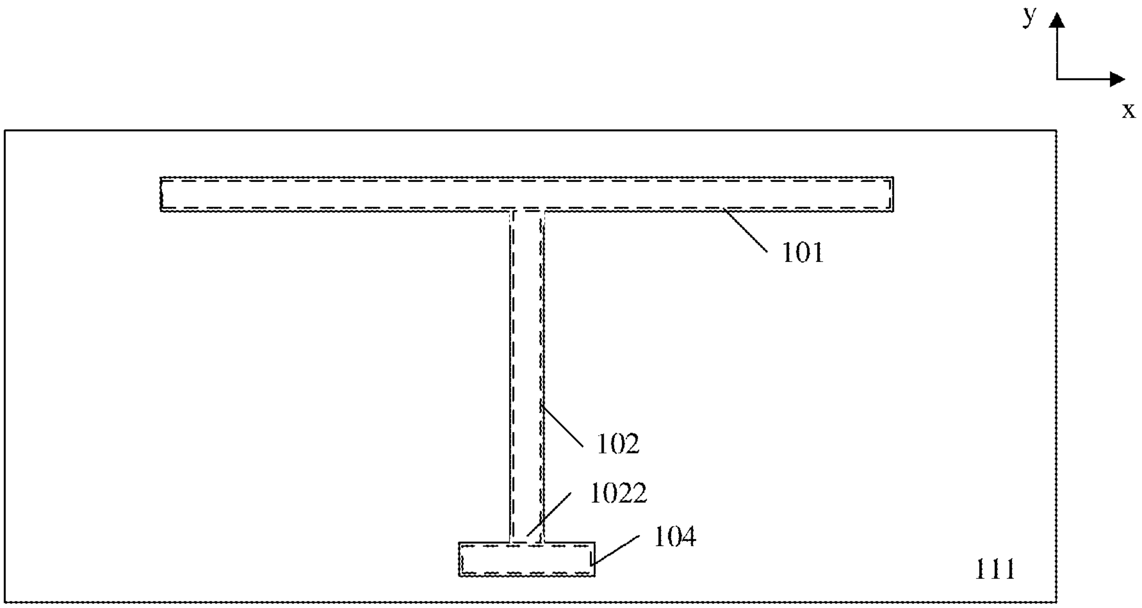
FIG. 9(*a*) to FIG. 9(*c*) are a schematic diagram of a structure of a first metal layer 111 according to an embodiment of this application.
Figure 9B:
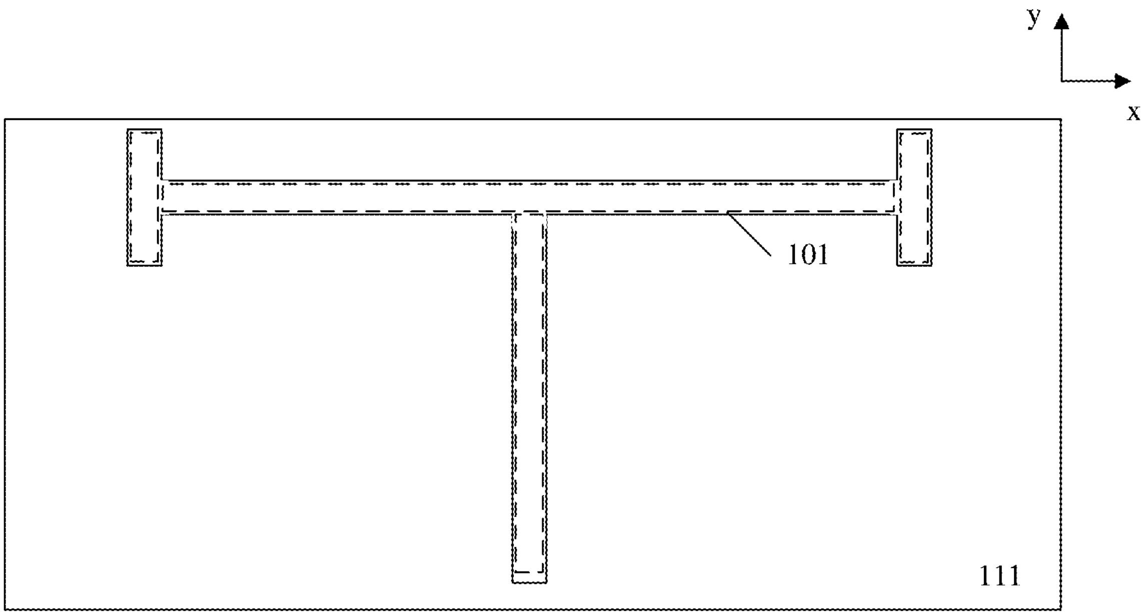
Figure 9C:
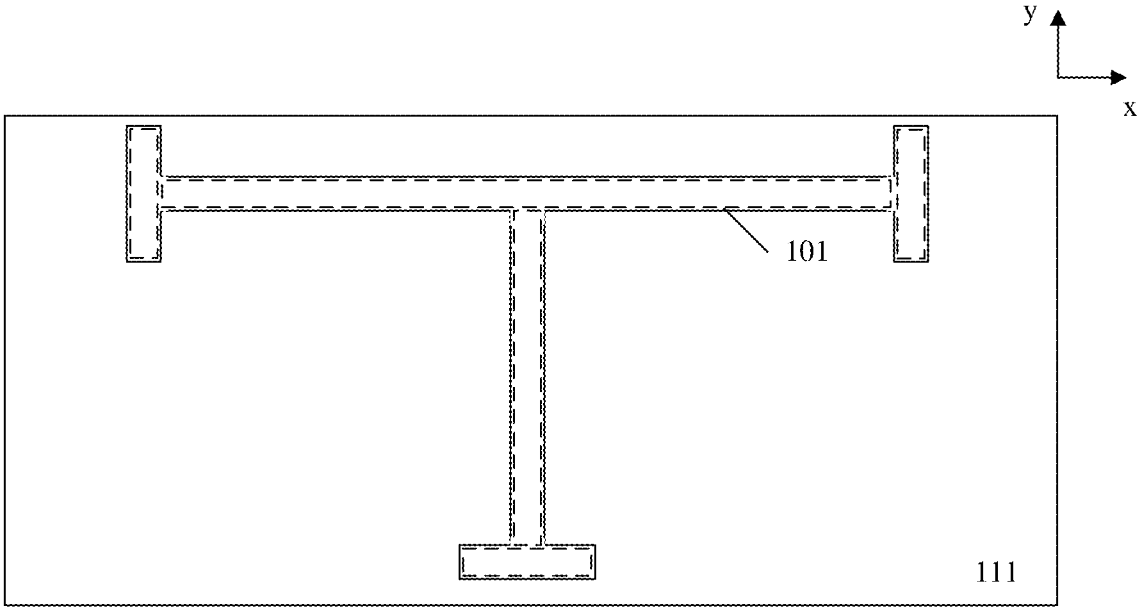

FIG. 9(*a*) to FIG. 9(*c*) are a schematic diagram of a structure of the first metal layer 11 according to an embodiment of this application.

As shown in FIG. 9(*a*), a fourth slot 104 may be provided on the first metal layer 111, and the fourth slot 104 is connected to a second end 1022 of the second slot 102, so that the second slot 102 communicates with the fourth slot 104. In an embodiment, the first slot, the second slot, and the fourth slot form a closed slot or sealed slot. In an embodiment, an I-shaped slot is provided on the first metal layer 11. In an embodiment, a width of a part of the I-shaped slot may be different, or a recess part or a protrusion part may be disposed in a partial region of the slot. This is not limited in this application. The fourth slot 104 may be configured to increase a magnetic flow path at the second end 1022 of the second slot 102, so that when the second feed unit performs feeding, a length of the second slot 102 is further shortened to reduce a width of the first metal layer 111 in a case in which the magnetic flow path in the T-shaped slot remains unchanged. This further reduces a width of the antenna structure.

Similarly, a length of the first slot 101 provided on the first metal layer 11 may alternatively be reduced in this manner, as shown in FIG. 9(*b*) and FIG. 9(*c*).

Figure 10:
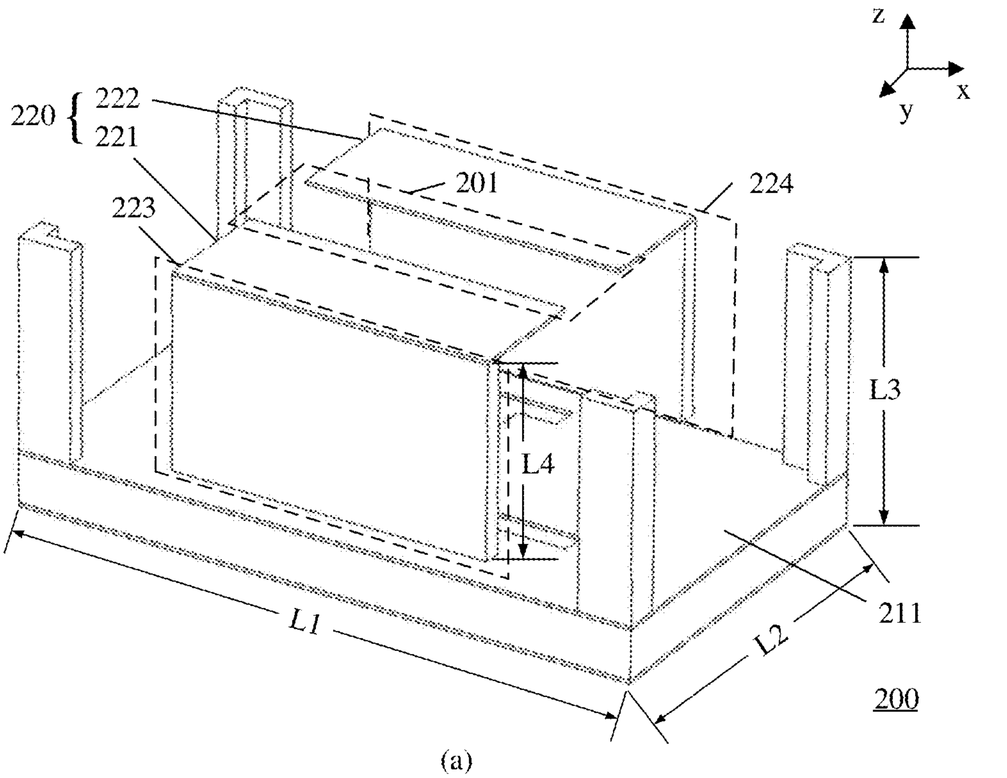
FIG. 10 is a schematic diagram of a structure of another antenna structure 200 according to an embodiment of this application.
Figure 10:
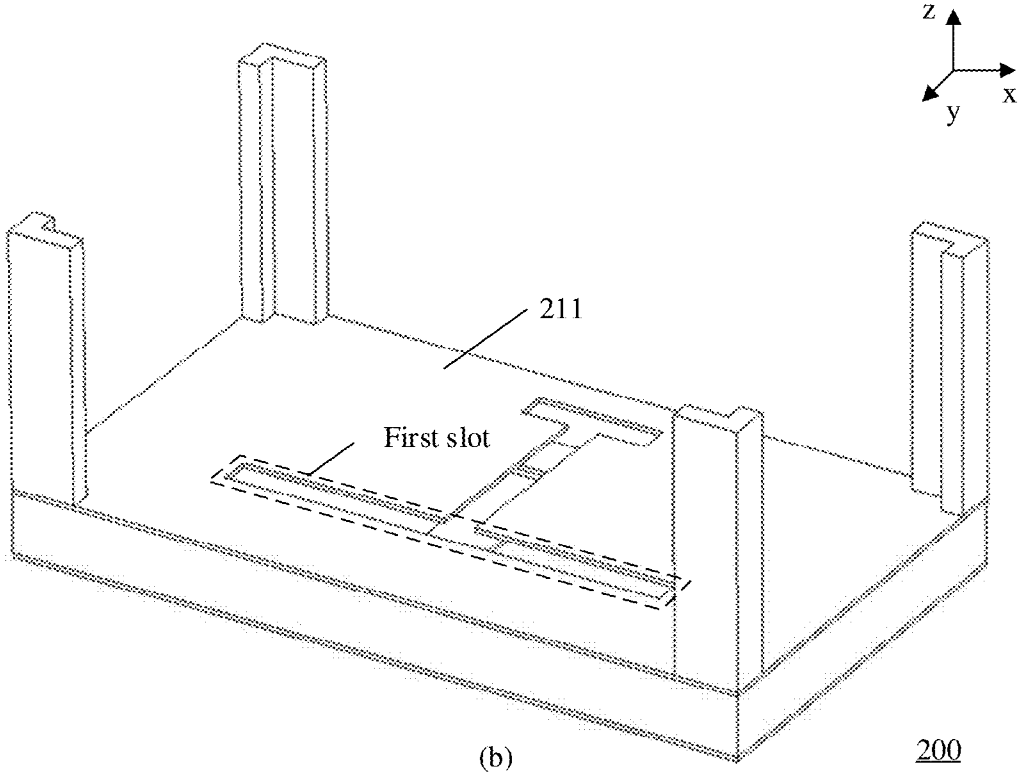

FIG. 10 is a schematic diagram of a structure of another antenna structure 200 according to an embodiment of this application.

As shown in (a) in FIG. 10, a fifth slot 201 is provided on a first radiator 220 of the antenna structure 200. An extension direction of the fifth slot 201 may be parallel to an extension direction of the first slot provided on a first metal layer 211, as shown in (b) in FIG. 10.

It should be understood that, for the antenna structure, a bottleneck of miniaturization is that a ground size is excessively small, and it is difficult to restrain an electromagnetic wave generated by a current on the ground. The electromagnetic wave generated by the current on the ground causes interference to an electromagnetic wave of an operating frequency band of the antenna structure, thereby reducing a radiation characteristic of the antenna structure.

Figure 11:
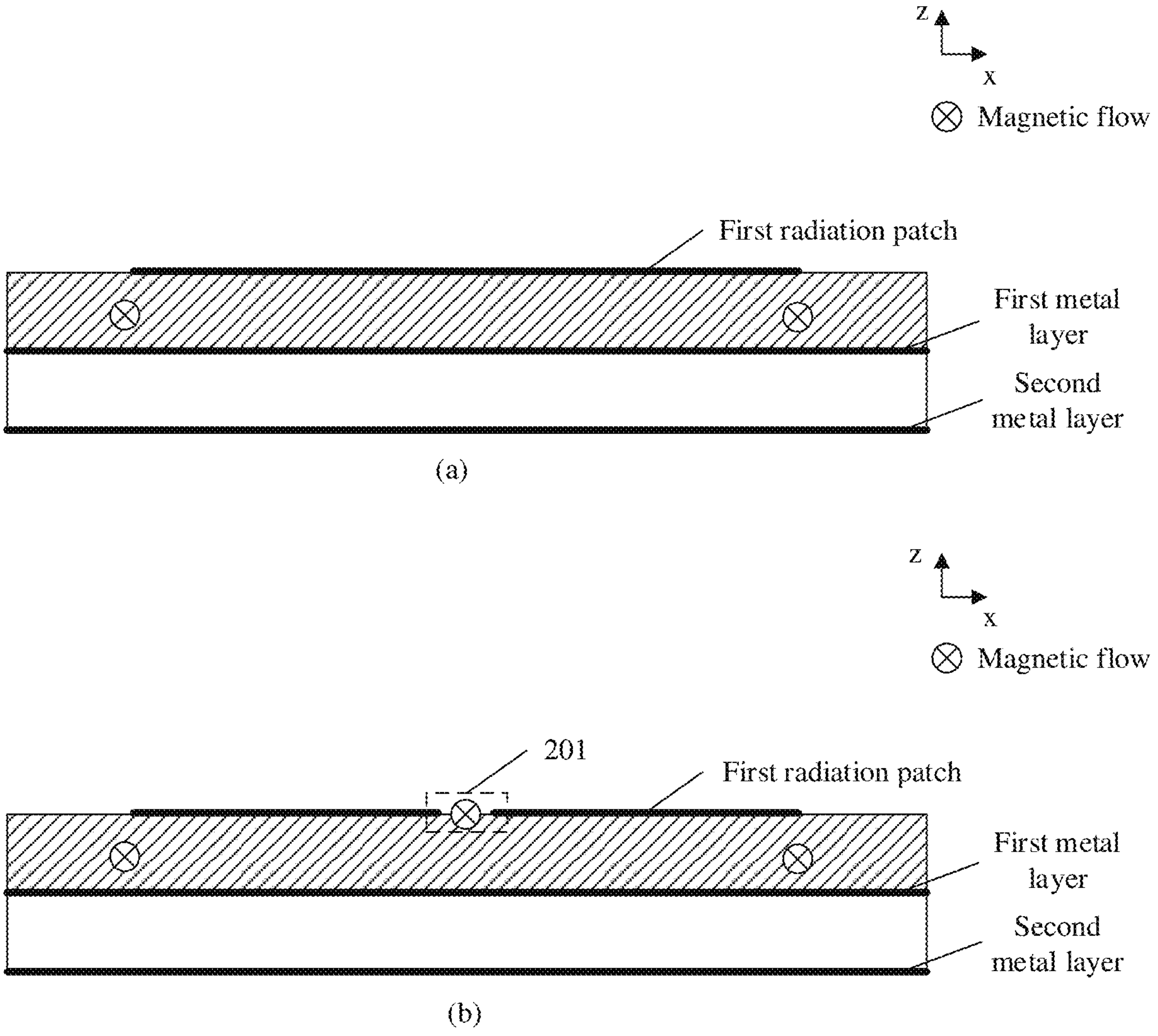
FIG. 11 is a schematic diagram of distribution of magnetic flows generated when a first radiator resonates according to an embodiment of this application.

Herein, (a) in FIG. 11 shows a schematic diagram of distribution of magnetic flows generated when the first radiator in the antenna structure shown in FIG. 4 resonates. When the first radiator resonates, two magnetic flows are respectively generated by using slots formed between two sides and the first metal layer, to radiate an electromagnetic wave outward. Herein, (b) in FIG. 11 shows a schematic diagram of distribution of magnetic flows generated when the first radiator in the antenna structure shown in FIG. 10 resonates. Because the fifth slot 201 is provided on the first radiator, an additional magnetic flow is generated by using the fifth slot 201 when the first metal layer resonates, so that electromagnetic waves of more operating frequency bands can be radiated outward, and a current on the ground (the second metal layer) is reduced, thereby improving a radiation characteristic of the antenna structure.

Because the fifth slot 201 is provided on the first radiator 220, an electrical length of the first radiator 220 in a width direction (y direction) of the antenna structure is reduced. Therefore, a size of the first radiator 220 in the width direction of the antenna structure needs to be increased, but this causes an increase in a width of the antenna structure.

In an embodiment, the fifth slot 201 may be a slot with openings at two ends. The first radiator 220 includes a first part 221 and a second part 222 that are spaced apart by the third slot 201. The first part 221 may include a bent radiator 223, and the bent radiator 223 bends towards the first metal layer 211. The second part 222 includes a bent radiator 224, and the bent radiator 224 bends towards the first metal layer 211. The first radiator 220 of a planar structure is folded into a three-dimensional structure, to reduce a width of the first radiator 220, and reduce a width of the antenna structure. This implements miniaturization of the antenna structure, so that the antenna structure is disposed in the electronic device.

In an embodiment, the first part 221 in a first bending region 223 and the second part 222 in a second bending region 224 may be implemented through metal holes. The first part 221 and the second part 222 of the first radiator 220 may include a metal layer disposed on a surface of a first dielectric board, and a plurality of metal holes that are provided in the first dielectric board and that are connected to the metal layer.

It should be understood that, compared with the antenna structure 100 shown in FIG. 4, the antenna structure 200 shown in FIG. 10 further reduces a size of the antenna structure by folding the first radiator onto a first metal surface and providing an I-shaped slot (a second end of the second slot is connected to a slot) on the first metal surface. The size of the antenna structure is reduced from 3.5 mm×2.8 mm×1 mm of the antenna structure 100 shown in FIG. 4 to 3.5 mm×2.6 mmxi mm (L1×L2×L3), and a width L2 of the antenna structure 200 is reduced from 2.8 mm to 2.6 mm.

When a height L3 of the antenna structure 200 is increased, a height L4 of the first part 221 in the first bending region 223 is increased, and the width of the antenna structure 200 may be further reduced. When the height L3 of the antenna structure 200 is increased from 1 mm to 1.5 mm, the width L2 of the antenna structure 200 may be reduced from 2.6 mm to 2 mm.

Figure 12:
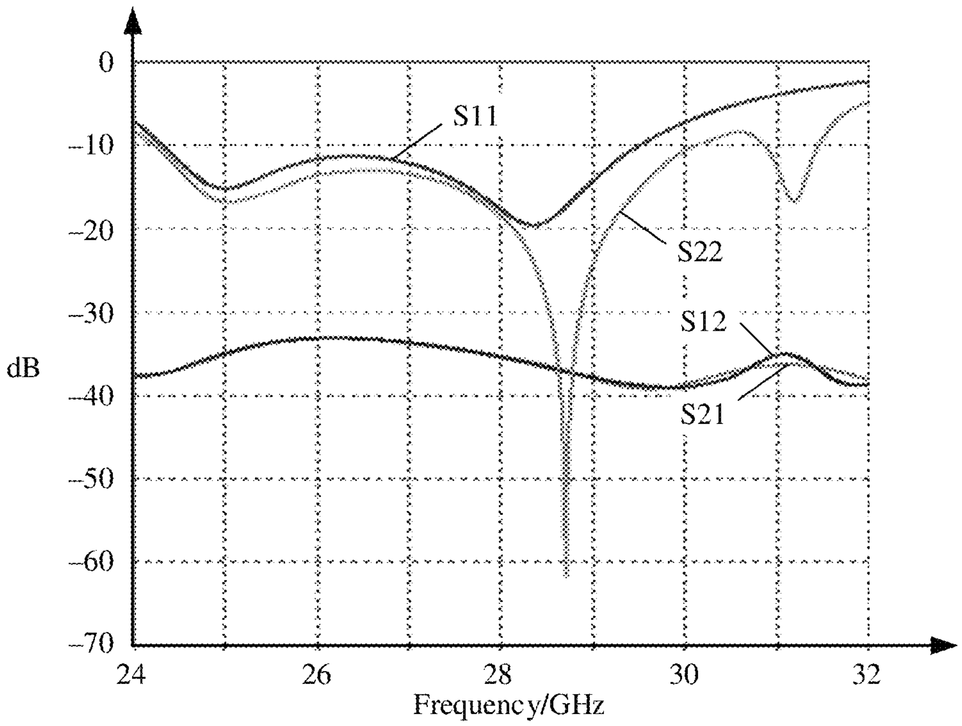
FIG. 12 is a diagram of S-parameter simulation results of the antenna structure shown in FIG. 10.
Figure 13:
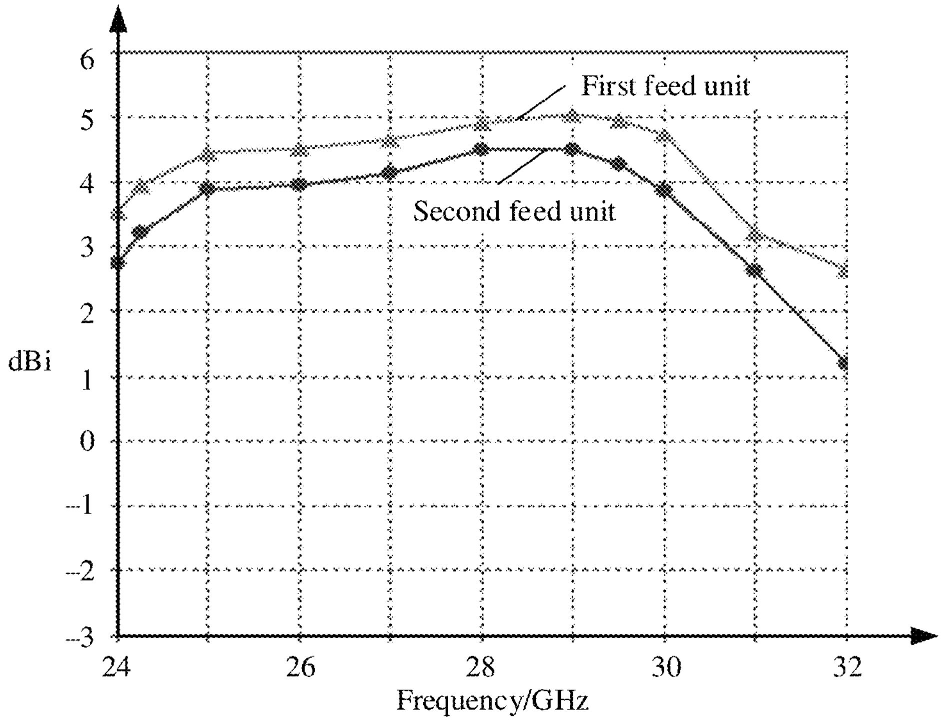
FIG. 13 is a diagram of gain-simulation results of the antenna structure shown in FIG. 10.

FIG. 12 and FIG. 13 are diagrams of simulation results of the antenna structure shown in FIG. 10. FIG. 12 is a diagram of S-parameter simulation results of the antenna structure shown in FIG. 10. FIG. 13 is a diagram of gain-simulation results of the antenna structure shown in FIG. 10.

As shown in FIG. 12, when a first feed unit (S11) and a second feed unit (S22) perform feeding, a resonant frequency band generated by the antenna structure may include n257 and n258 frequency bands (24.25 GHz to 29.5 GHz), and a relative bandwidth of the antenna structure is approximately 19.6%. In addition, when the first feed unit and the second feed unit perform feeding, the antenna structure separately radiates a horizontally polarized electromagnetic wave and a vertically polarized electromagnetic wave. Therefore, when the first feed unit and the second feed unit perform feeding, isolation (S12 and S21) between the first feed unit and the second feed unit is less than −30 dB, and the isolation is good, so that the antenna structure can be used in a MIMO system.

As shown in FIG. 13, in the n257 and n258 frequency bands (24.25 GHz to 29.5 GHz), a gain of the antenna structure when the first feed unit and the second feed unit perform feeding ranges from 3.1 dBi to 5 dBi, and the gain is good, so that a communication requirement can be met.

Figure 14:
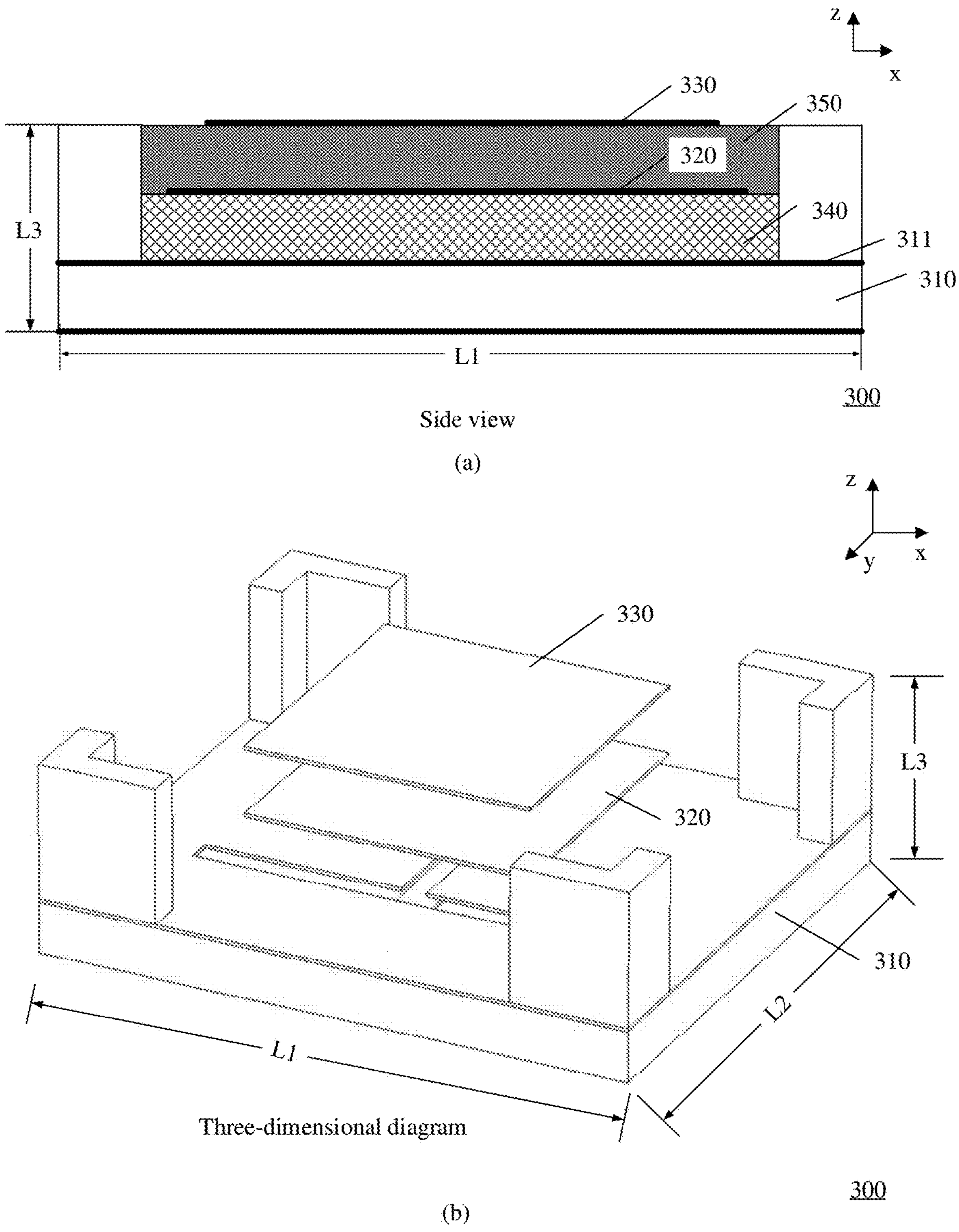
FIG. 14 is a schematic diagram of a structure of another antenna structure 300 according to an embodiment of this application.

FIG. 14 is a schematic diagram of a structure of another antenna structure 300 according to an embodiment of this application.

As shown in FIG. 14, the antenna structure 300 may include a metal cavity 310, a first radiator 320, and a second radiator 330.

In an embodiment, the second radiator 330 and the first radiator 320 are disposed opposite to each other and are spaced apart, and the second radiator 330 is located on a side that is of the first radiator 320 and that is away from the metal cavity 310. In an embodiment, the first radiator 320 and the second radiator 330 may be disposed above a first metal layer 311 of the metal cavity 310, as shown in (a) in FIG. 14.

In an embodiment, the antenna structure 300 may include a first dielectric board 340 and a second dielectric board 350. The first dielectric board 340 may be disposed between the first metal layer 311 and the first radiator 320, and is configured to support the first radiator 320. The second dielectric board 350 may be disposed between the first radiator 320 and the second radiator 330, and is configured to support the second radiator 330.

It should be understood that, compared with the antenna structure 100 shown in FIG. 4, a second radiator 320 is additionally disposed in the antenna structure 300 shown in FIG. 14, and may be used to generate an additional resonant frequency band, to expand an operating frequency band of the antenna structure 300, so that the operating frequency band includes more communication frequency bands. For example, the operating frequency band may include both n257 and n258 frequency bands (24.25 GHz to 29.5 GHz) and n259 and n260 frequency bands (37 GHz to 43.5 GHz).

In an embodiment, dielectric materials of the first dielectric board 340 and the second dielectric board 350 may be the same or different, and may be adjusted according to actual production or design. This is not limited in this application.

In an embodiment, sizes of the first radiator 320 and the second radiator 330 may be different, and an area of the first radiator 320 is greater than an area of the second radiator 330.

Figure 15:
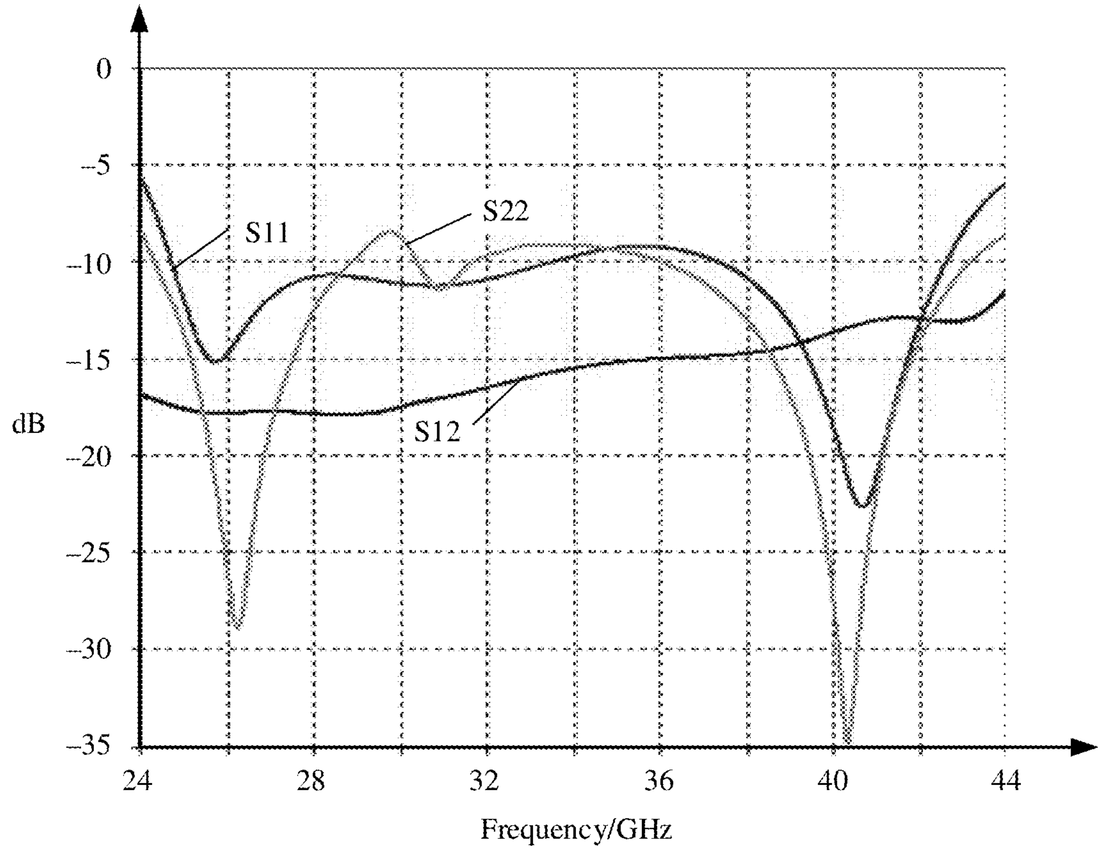
FIG. 15 is a diagram of S-parameter simulation results of the antenna structure shown in FIG. 14.

FIG. 15 is a diagram of S-parameter simulation results of the antenna structure shown in FIG. 14.

It should be understood that, for brevity of description, in this embodiment of this application, an example in which a size of the antenna structure shown in FIG. 14 is 3.5 mm×2.6 mm×1.4 mm (L1×L2×L3) is used for description, and adjustment is performed in actual production or design. This is not limited in this application.

As shown in FIG. 15, because the antenna structure includes the second radiator, when a first feed unit (S11) and a second feed unit (S22) perform feeding, the antenna structure may generate an additional resonant frequency band at a high frequency, so that an operating frequency band of the antenna structure may include n257 and n258 frequency bands (24.25 GHz to 29.5 GHz), and n259 and n260 frequency bands (37 GHz to 43.5 GHz). In addition, when the first feed unit and the second feed unit perform feeding, the antenna structure separately radiates a horizontally polarized electromagnetic wave and a vertically polarized electromagnetic wave. Therefore, when the first feed unit and the second feed unit perform feeding, isolation (S12) between the first feed unit and the second feed unit is less than −10 dB, and the isolation is good, so that the antenna structure can be used in a MIMO system.

A person skilled in the art may use different methods to implement the described functions for each specific application, but such implementation should not be considered beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna structure, comprising:

a metal cavity, wherein the metal cavity comprises a first metal layer and a second metal layer that are disposed opposite to each other, and a metal wall that connects the first metal layer and the second metal layer; and a first radiator, wherein the first radiator and the metal cavity are disposed opposite to each other and are spaced apart, and the first radiator is located on a side that is of the first metal layer and that is away from the second metal layer, wherein a first slot and a second slot are disposed on the first metal layer, and a first end of the second slot is connected to the first slot;

wherein projections of the first slot, the second slot, and the first radiator in a first direction at least partially overlap, and the first direction is a direction perpendicular to the first metal layer; and wherein a first feed point is disposed in the first slot, and a second feed point is disposed in the second slot.

2. The antenna structure according to claim 1, wherein a third slot is disposed on the first radiator, and an extension direction of the third slot is parallel to an extension direction of the first slot.

3. The antenna structure according to claim 2, wherein the first radiator comprises a first part and a second part that are spaced apart by the third slot.

4. The antenna structure according to claim 3, wherein the first part comprises a bent radiator that is bent towards the first metal layer; and the second part comprises a bent radiator that is bent towards the first metal layer.

5. The antenna structure according to claim 1, wherein the antenna structure further comprises:

a second radiator, wherein the second radiator and the first radiator are disposed opposite to each other and are spaced apart, and the second radiator is located on a side that is of the first radiator and that is away from the metal cavity.

6. The antenna structure according to claim 1, wherein the first feed point is disposed at a joint of the first slot and the second slot.

7. The antenna structure according to claim 1, wherein the first slot has a same length on two sides of the first feed point.

8. The antenna structure according to claim 1, wherein the antenna structure further comprises:

a first feed stub and a second feed stub, wherein the first feed stub and the second feed stub are disposed in the metal cavity;

wherein projections of the first feed stub and the first slot in the first direction at least partially overlap; and wherein projections of the second feed stub and the second slot in the first direction at least partially overlap.

9. The antenna structure according to claim 8, wherein the first feed stub is L-shaped, and the second feed stub is straight line-shaped.

10. The antenna structure according to claim 1, wherein the antenna structure further comprises at least one metal post;

wherein the at least one metal post is disposed on any side around the first radiator; and wherein the metal post is electrically connected to the first metal layer.

11. The antenna structure according to claim 1, wherein an extension direction of the first slot is perpendicular to an extension direction of the second slot.

12. The antenna structure according to claim 1, wherein a physical length of the first slot is a half of a first wavelength±10%, a physical length of the second slot is a quarter of the first wavelength, and the first wavelength is an operating wavelength of the antenna structure±10%.

13. The antenna structure according to claim 1, wherein a fourth slot is disposed on the first metal layer, and the fourth slot is connected to a second end of the second slot.

14. The antenna structure according to claim 1, wherein a width of the antenna structure is less than 3.5 mm, or a length of the antenna structure is less than 4.5 mm.

15. The antenna structure according to claim 1, wherein an operating frequency band of the antenna structure ranges from 24.25 GHz to 29.5 GHZ, or an operating frequency band of the antenna structure ranges from 37 GHz to 43.5 GHz.

16. An electronic device, comprising:

an antenna structure, the antenna structure comprises:

a metal cavity, wherein the metal cavity comprises a first metal layer, a second metal layer, and a metal wall that connects the first metal layer and the second metal layer; and a first radiator, wherein the first radiator and the metal cavity are spaced apart, and the first radiator is located on a same side of the metal cavity as the first metal layer, wherein a first slot and a second slot are provided on the first metal layer, and a first end of the second slot is connected to the first slot;

wherein projections of the first slot, the second slot, and the first radiator in a direction perpendicular to the first metal layer at least partially overlap; and wherein a first feed point is disposed in the first slot, and a second feed point is disposed in the second slot.

17. The electronic device according to claim 16, wherein the electronic device further comprises a side frame;

a fifth slot is provided on the side frame; and at least a part of the antenna structure is disposed between conductors on two sides of the fifth slot.

18. The electronic device according to claim 16, wherein the electronic device further comprises a first dielectric board, and the first dielectric board is disposed between the first metal layer and the first radiator.

19. The electronic device according to claim 16, wherein the antenna structure further comprises a second radiator, wherein the second radiator and the first radiator are spaced apart, and the second radiator is located on a side that is of the first radiator and that is away from the metal cavity; and wherein the electronic device further comprises a second dielectric board, and the second dielectric board is disposed between the first radiator and the second radiator.

20. The electronic device according to claim 16, wherein the antenna structure further comprises:

a first feed stub and a second feed stub disposed in the metal cavity;

wherein projections of the first feed stub and the first slot in the direction perpendicular to the first metal layer at least partially overlap;

wherein projections of the second feed stub and the second slot in the direction perpendicular to the first metal layer at least partially overlap;

wherein the electronic device further comprises a third dielectric board and a fourth dielectric board;

wherein at least a part of the third dielectric board and at least a part of the fourth dielectric board are stacked in the metal cavity in the direction perpendicular to the first metal layer; and wherein the first feed stub and the second feed stub are disposed between the third dielectric board and the fourth dielectric board.

* * * * *